United States Patent
Fayyad et al.

(10) Patent No.: US 6,633,882 B1
(45) Date of Patent: Oct. 14, 2003

(54) MULTI-DIMENSIONAL DATABASE RECORD COMPRESSION UTILIZING OPTIMIZED CLUSTER MODELS

(75) Inventors: Usama Fayyad, Mercer Island, WA (US); Jayavel Shanmugasundaram, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 482 days.

(21) Appl. No.: 09/606,964

(22) Filed: Jun. 29, 2000

(51) Int. Cl.[7] ............................................... G06F 17/30
(52) U.S. Cl. ............................................ 707/101; 707/6
(58) Field of Search ................................. 707/1–7, 102, 707/103 R

(56) References Cited

U.S. PATENT DOCUMENTS

| | | | | |
|---|---|---|---|---|
| 5,884,305 A | * | 3/1999 | Kleinberg et al. | 707/6 |
| 6,115,708 A | * | 9/2000 | Fayyad et al. | 707/6 |
| 6,230,153 B1 | * | 5/2001 | Howard et al. | 707/2 |
| 6,374,251 B1 | * | 4/2002 | Fayyad et al. | 707/101 |
| 6,564,202 B1 | * | 5/2003 | Schuetze et al. | 707/1 |

OTHER PUBLICATIONS

C.M. Bishop. "Neural Networks for Pattern Regcognition." *Bayes Theorem.* Clarendon Press. Oxford pp. 17–23 (1995).
C.M. Bishop. "Neural Networks for Pattern Regcognition." *The Normal Distribution.* Clarendon Press Oxford pp. 34–38 (1995).
C.M. Bishop. "Neural Networks for Pattern Regcognition." *Maximum Likelihood.* Clarendon Press Oxford pp. 39–42 (1995).
C.M. Bishop. "Neural Networks for Pattern Regcognition." *Density Estimation in General.* Clarendon Press Oxford pp. 51–55 (1995).
C.M. Bishop. "Neural Networks for Pattern Regcognition." *Mixture Models/Maximum Likelihood/EM Algorithm.* Clarendon Press Oxford pp. 59–72 (1995).
R. Duda and P. Hart. "Pattern Classification and Scene Analysis." *Bayes Decision Theory.* John Wiley & Sons pp. 10–13 (1973).
R. Duda and P. Hart. "Pattern Classification and Scene Analysis." *The Normal Density.* John Wiley & Sons pp. 22–24 (1973).
R. Duda and P. Hart. "Pattern Classification and Scene Analysis." *Maximum Likelihood Estimation.* John Wiley & Sons pp. 45–49 (1973).
R. Duda and P. Hart. "Pattern Classification and Scene Analysis." *Sufficient Statistics and The Expotential Family.* John Wiley & Sons pp. 62–66 (1973).
R. Duda and P. Hart. "Pattern Classification and Scene Analysis." *Density Estimation.* John Wiley & Sons pp. 85–88 (1973).

(List continued on next page.)

*Primary Examiner*—Safet Metjahic
*Assistant Examiner*—Marc Filipczyk
(74) *Attorney, Agent, or Firm*—Watts, Hoffmann Co., LPA

(57) ABSTRACT

Apparatus and method for use in querying a database containing data records. The database is characterized by a compression scheme to provide data clustering information. In accordance with a exemplary embodiment of the invention a functional representation of data clustering is a Gaussian and the queries are performing by integrating the Gaussian corresponding to each of the data clusters over the ranges to determine the sum or the count of data records from the database that fall within the selected ranges. The process chooses a value for the cluster number K. The cluster model is next broken up into areas (tiles) based on user defined parameters. Data from the database is then classified based on the tiling information. A sorted version of the classified data, ordered by cluster number and then by the tile number within the cluster is generated. This data is then evaluated to test the sufficiency of the model created during the clustering.

39 Claims, 6 Drawing Sheets

OTHER PUBLICATIONS

R. Duda and P. Hart. "Pattern Classification and Scene Analysis." *Unsupervised Learning and Clustering.* John Wiley & Sons pp. 189–200 (1973).

R. Duda and P. Hart. "Pattern Classification and Scene Analysis."Clustering Criteria (K–Mean). John Wiley & Sons pp. Chap. 6 pp. 217–219 (1973).

R. Duda and P. Hart. "Pattern Classification and Scene Analysis." *Iterative Optimization* relates to K–Mean/EM). John Wiley & Sons Chap. 6 pp. 225–228 (1973).

K. Fukunaga. "Statistical Pattern Recognition". *Bayes Theorem.* Academic Press Chap. 1 pp. 12–13 (1990).

K. Fukunaga. "Statistical Pattern Recognition". *Normal Distributions.* Academic Press Chap. 2 pp. 16–24 (1990).

K. Fukunaga. "Statistical Pattern Recognition". *Clustering.* Academic Press Chap. 11 pp. 508–512 (1990).

R. Duda and P. Hart. "Pattern Classification and Scene Analysis." *Nearest Mean Reclassification Algorithm (K–Mean).* Academic Press Chap. 11 pp. 515–523 (1990).

K. Fukunaga. "Statistical Pattern Recognition". *Maximum Likelihood.* Academic Press Chap. 11 pp. 527–532 (1990).

S. Agarwal et al. "On the Computation of Multidimensional Aggregates." Proc. 22nd Int. VLDB Conf., Mumbai (Bombay), (1996).

J. Banfield, A Raftery, "Model–based Gausian and Non-–Gausian Clustering." Biometrics, vol. 49:803–821, (1993).

D. Barbara, M. Sullivan, "A Space Efficient Way to Support Approximate Multidimensional Databases". George Mason University Technical Report ISSE–TR–98–03, (1998).

K.S. Beyer, R. Ramakrishnan, "Bottom–Up Computation of Sparse Iceberge Cubes", Proc. ACM SIGMOD Conf., Philadelphia, (1999) (to appear).

P.S. Bradley et al., "Clustering via Concave Minimization", Advances in Neural Information Processing Systems 9, MIT Press, (1997).

P.S. Bradley et al., "Scaling Clustering Algorithms to Large Databases", Proc. 4th Intl. Conf. On Knowledge Discovery and Data Mining (KDD98), AAAI Press, (1998).

P.S. Bradley et al., "Scaling EM Clustering to Large Databases", Microsoft Research Technical Report MSR–TR–98–35, (1998).

P.M. Deshpande et al., "Caching Multidimensional Queries Using Chunks", Proc. ACM SIGMOD Conf., Seattle, (1998).

D. Fisher, "Knowledge Acquisition Via Incremental Conceptual Clustering", Machine Learning, 2:139–172, (1987).

J. Gray et al., "Data Cube: A Relational Aggregation Operator Generalizing Group–By, Cross–Tab and Sub–Totals", Data Mining and Knowledge Discovery, 1(1), pp 29–53, (1997).

H. Gupta et al., "Index Selection for OLAP", Proc. Intl. Conf. On Data Engineering, Birmingham, UK, (Apr. 1997).

V. Harinarayan et al., "Implementing Data Cubes Efficiently", Proc. ACM SIGMOD Conf. Montreal, (1996).

R. Kohavi, "Scaling Up the Accuracy of Naive–Bayes Classifiers: A Decision Tree Hybrid". Proc. of the 2nd International Conf. On Knowledge Discovery and Data Mining. AAA1 Press, (1996).

Y. Kotidis, N. Rousopoulos, "An Alternative Storage Organization for ROLAP Aggregate Views Based on Cubetrees", Proc., ACM SIGMOD Conf., Seattle, (1998).

I. Mumick et al., "Maintenance of Data Cubes and Summary Tables in a Warehouse", Proc. ACM SIGMOD Conf. Tucson, (1997).

V. Poosala, Y. E. Ionnidis, "Selectivity Estimation without the Attribute Value Independence Assumption", Proc. 23rd VLDB Conf., Athens, Greece, (1997).

S. Z. Selim, M. A. Ismail, "K–Means Type Algorithms: A Generalized Convergence Theorem and Characterization of Local Optimality", IEEE Trans. Pattern Analysis and Machine Intelligence, vol. PAMI–6, No. 1, (1984).

A. Shulka et al., "Storage Estimation for Multidimensional Aggregates in the Presence of Hierarchies", Proc. 22nd Int. VLDB Conf. Mumbai, Bombay, (1996).

J. S. Vitter et al., "Data Cube Approximation and Histograms via Wavelets", Proc. 7th Intl. Conf. Information and Knowledge Management (CIKM 98), Washington, D.C., (Nov. 1998).

T. Zhang, "BIRCH: An Efficient Data Clustering Method for Very Large Databases", Proc. ACM SIGMOD Conf. Montreal, (1996).

Y. Zhao et al., "An Array–Based Algorithm for Simultaneous Multidimensional Aggregates", Proc. ACM SIGMOD Conf., Tucson, (1997).

Y. Zhao et al., "Simultaneous Optimization and Evaluation of Multiple Dimensional Queries", Proc. ACM SIGMOD Conf., Seattle, (1998).

* cited by examiner

MULTI-DIMENSIONAL DATABASE RECORD COMPRESSION UTILIZING OPTIMIZED CLUSTER MODELS

FIELD OF THE INVENTION

The present invention concerns data mining of large database and more particularly to an improved method and apparatus for answering queries based on the data contained in large databases.

BACKGROUND ART

A database management system (DBMS) stores data reliably and retrieves the data based on a data access language, typically SQL (Structured Query Language). One major use of database technology is to help individuals and organizations obtain fast/flexible reports on performance of a business. Another major use of DBMS is to help make decisions and generate reports based on the data contained in the database.

An important aid to the users making decisions based on data in the database is a multidimensional view of data. For example, in a payroll application, the data could be represented with three dimensions such as salary, years of employment and vested dollar amounts in a company pension plan. With this view of the data, it is easy to ask queries such as query that finds the average number of years of employment of employees who have a salary greater than 100,000 dollars. Alternatively, it might be desirable to specify a range of years of employment and ask for the total contribution in dollars for people falling in that range. The multidimensional approach facilitates the view of the data and also does not distinguish between the dimensions in which ranges can be specified and the dimensions on which sums and aggregations are performed. Further, users can specify ranges in different dimensions if they need to view data in more detail. Thus, in the above example, users could ask for the average salary of employees who have more than 100,000 dollars in vested company benefits and who have worked for the company for less than 5 years. Other applications that benefit from the multidimensional view of data include inventory control, sales and marketing, user, or customer databases.

One of the emerging applications of databases is online analytical processing (OLAP) which enables users to ask decision support queries in a more natural and efficient manner than SQL-based database systems. A commonly used approach for queries that use OLAP is the so-called data cube approach which views the data records stored in the database as points in a multidimensional space. Users ask queries using the data cube approach by specifying in the query the dimensions or record attributes of interest and ranges for those dimensions.

One commonly asked OLAP query is a count query that determines the number of data records falling within a selected range. A second common query is the aggregate query which totals the values for the records falling within a selected range. By adding or deleting a dimension to a query a user can drill down or roll up over the multi-dimensional space of the database.

Transact-SQL (T-SQL) is a superset of standard SQL and forms part of SQL server version 6.5, a product of Microsoft Corporation, assignee of the present invention. Transact SQL provides two special operators, CUBE and ROLLUP, that allow multidimensional analysis to be projected by the database server where the analysis can be optimized as part of the execution plan of the query. A discussion of the CUBE and ROLLUP operators is found in the book "Inside SQL Server 6.5 " by Soukup, Copyright 1997, Microsoft Press, pp 326–340 which is incorporated herein by reference.

As data warehousing becomes more popular, OLAP is gaining in importance as a primary interface to evaluating data contained in the data warehouse. Most successful data mining applications include reporting systems having fast query response mechanisms. Most corporations require decision support and would benefit from improved technology to help in making decisions based upon rapidly gathered and organized data.

Specific applications include marketing aided by querying past sales data, inventory management based on querying the inventory database, hierarchical visualization of employee data and many other decision support applications. The applications of OLAP are not limited to large organizations. The concept of the data cube could be viewed as a hierarchical organization of data in general and this could be an easily understood interface that provides summarized and organized access to large volumes of data to every type of user.

One goal of a database management system is efficient support for queries on data cubes. The prior art has (a) dealt with providing exact answers to queries and (b) dealt mainly with discrete valued dimensions and (c) treated the dimension on which the aggregation or average is performed as a dimension that is distinct from the dimensions of the data cube. Because prior art techniques concentrated on providing exact answers, the amount of data that was stored was large and expensive disk accesses were required, thus making query processing expensive. Not being able to efficiently pose queries on continuous valued dimensions limits the types of applications and the scope of data cubes. Treating all dimensions symmetrically and allowing aggregation on every dimension is not possible with such prior art systems.

Being able to quickly query the data presented in the multidimensional format is crucial to the effective usage of a data cube. Typically, answers to the queries on the data cube are not required with perfect accuracy and users are willing to trade off accuracy for rapid answers to these queries.

SUMMARY OF THE INVENTION

The present invention enables the effective summarization of large amounts of data and provides rapid answers to decision support queries on data cubes. A principle feature of the invention is the recognition that data can be viewed as points in a multidimensional space and hence can be effectively summarized using clustering techniques.

An exemplary embodiment of the present invention concerns method and apparatus for querying a database containing data records stored in the database. A cluster model is formed from data records that are stored in the database. An initial cluster model having an initial probability distribution describing data records in the database is thus provided. By comparing the initial probability distribution with a representative sample of records in the database a sufficiency of this initial probability distribution is determined. The cluster model is then modified to provide an adjusted cluster model that better characterizes the data in the database. The cluster modification is performed by adjusting the cluster model to reduce discrepancies between the initial probability distribution and data sampled from the database.

Once the adjusted cluster model is provided, a sum or a count of data records from the database falling within specified ranges of the multiple dimensions is determined by integrating a functional representation based on the probability distribution of the adjusted cluster model over the ranges. In one embodiment of the invention the cluster model is adjusted by increasing the cluster number of the cluster model and reclustering at least a portion of the data in the database.

Choice of a starting point for a new cluster is performed by finding a region within an attribute space of the data records of high discrepancy between the initial cluster model and a sample of data gathered from the database. Since this region is not well modeled by initial cluster model, it serves as a candidate point for a new cluster and will result in a shifting of existing clusters and formation of a new cluster near the region of high discrepancy.

Records in the database have one or more attributes containing continuous, nondiscrete data values. Each of these cluster attributes is characterized by a Gaussian functional depiction of the cluster that can be integrated (using numerical approximation techniques) over the data space of the records.

Experience with data clustering has indicated that clustering models do not well model so called outlying data records from removed from any cluster mean. In one embodiment of the invention the functional representation excludes certain data records by identifying outlying data records as not falling within a data cluster. The process of determining a sum or a count total used in responding to queries of the database adds contributions from the outlying data records to the results of the integrating step.

The present invention can be used to find the number of clusters and good initialization points for the clusters in both discrete and continuous space. The method works by performing an intelligent search for the clusters such that the time required to both find an optimum cluster number and perform the clustering is on the order of the time required to cluster the data if the number of clusters were known beforehand. This invention is thus a means for "optimally" clustering a large-scale database in the situation when the user has little or no prior knowledge about the actual number of clusters.

The invention identifies areas of multidimensional space that have a higher or lower density of points than is predicted by the current model (clusters). The current model is then further refined by growing new clusters in those areas so that the new model better fits the data. The method proceeds stops when the all areas in the multidimensional space fit "sufficiently" well to the model. The process chooses a value for the cluster number K.

An exemplary embodiment of the invention starts with one cluster having an arbitrarily assigned mean or centroid for each dimension of data within the database. This one cluster is selected without accessing the data in the database. Using this starting point data is retrieved or read from the database and a cluster model is built from the data using the single starting cluster.

The cluster model is next broken up into areas (tiles) based on user defined parameters. Each cluster is split to a number of tiles based on the data. Data from the database is then classified based on the tiling information. A sorted version of the classified data, ordered by cluster number and then by the tile number within the cluster is generated. This data is then evaluated to test the sufficiency of the model created during the clustering. If the model is insufficient (inaccurate) in modeling the data then new cluster initialization points are generated. The data is again clustered and a clustering model created. The sufficiency of this model is then again evaluated and the process of clustering stopped when a 'good' model has been created.

For large databases a refinement is to cluster using only a sample of the data but to perform classification on the entire data set. For large databases this model that has been judged to be sufficient provides an initialization point for a full clustering of the data in the database by one of a number of possible clustering procedures.

It is possible to approximately compare the cost of clustering the data when the number of clusters is know versus the cost in determining the cluster number and then clustering. The invention enables effective and accurate clustering in computational times that are approximately a factor of two greater than optimal clustering algorithms that have complete knowledge of the number of clusters before clustering (a unrealistic assumption in real world applications). Further, the proposed technique is applicable for both continuous and discrete clustering. A special feature of this method is that it determines good initial starting points for the clustering process in addition to determining K. Further, this method can be used with most variants of clustering algorithms, including scaleable clustering algorithms that cluster in just one pass over the data using a limited amount of computer memory.

These and other objects, advantages, and features of the invention are further discussed in the detailed description of an exemplary embodiment of the invention which is described in conjunction with the accompanying drawings.

DETAILED DESCRIPTION OF AN EXEMPLARY EMBODIMENT OF THE INVENTION

Figure 2:
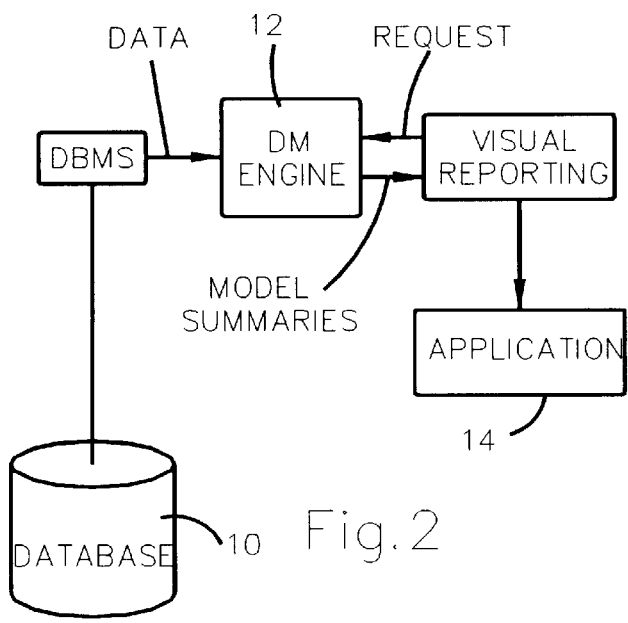
FIG. 2 is a block diagram of components constructed in accordance with an exemplary embodiment of the invention for querying data stored in a database.

The present invention has particular utility for evaluating data database 10 (FIG. 2) having many records stored on multiple, possibly distributed storage devices. Each record in the database 10 has many attributes or fields which for a representative database might include age, income, number of years of employment, vested pension benefits etc. Census data of this type can contain many millions of data records and a totally accurate query analysis is costly in terms of time and memory.

A significant observation is that if the data density of the database is known, then multi-dimensional aggregate queries can be answered without accessing the data. Several advantages result in executing a query using a density function rather than accessing the data. If the density function is compact, significant storage is saved as the actual data is not used in answering queries. If an integration over the density function is efficient, then executing queries using this density function is efficient. The same density function is used to answer many different aggregate queries (i.e. any dimension can also be a measure in OLAP terminology), without paying an added cost, leading to a further savings in space over traditional pre-computation approaches. Thus, a density-based approach addresses the limitations of existing pre-computational techniques. An exemplary embodiment of the invention employs data clustering techniques to derive a density estimation.

A data clustering model is produced by a computer 20 (FIG. 1) executing a stored computer program that implements a data mining engine or component 12. The clustering model derived from the database 10 is used for answering queries about the data records in the database.

Figure 5:
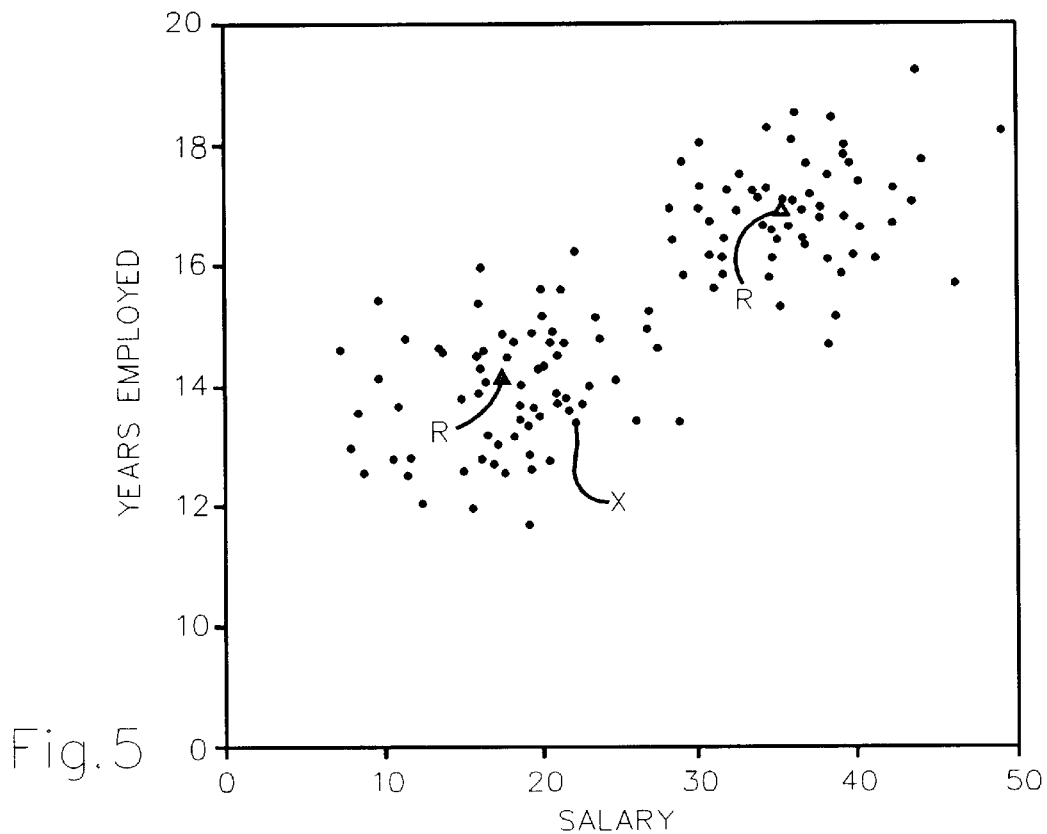
FIG. 5 is a two dimensional depiction showing a distribution of data records from a database.

FIG. 5 is a two dimensional depiction of data points extracted from the database 10. Such a depiction could be derived from a database having records of dimension n having a format of Table 1:

TABLE 1

| EmployeeID | Age | Salary | Years Employed | Vested Pension | n-4 other attributes |
|---|---|---|---|---|---|
| XXX-XX-XXXX | 46 | 39 K | 12 | 100 K | . . . |
| YYY-YY-YYYY | 40 | 29 K | 4 | 0 K | . . . |
| QQQ-QQ-QQQQ | 57 | 18 K | 23 | 250 K | . . . |

The two dimensions that are plotted in FIG. 5 are years of employment (vertical axis) and salary in thousands of dollars (horizontal axis). One can visually determine that the data in FIG. 5 is lumped or clustered together into two clusters.

Data is generally not uniformly distributed and some combinations of attribute values are more likely than others. Clustering can be viewed as identifying the dense regions of the probability density of the data source. An efficient representation of the probability density function is the mixture model: a model consisting of several components (e.g. a model consisting of the sum of 3 Gaussians). Each component generates a set of data records (a "cluster"). The data set is then a mixture of clusters and the problem is to identify the data points constituting a cluster and to infer the properties of the distribution governing each cluster. The mixture model probability density function has the form:

$$Pr(x) = \sum_{\lambda=1}^{k} W_\lambda Pr(x|\lambda).$$

The coefficients $W_\lambda$ (mixture weights) represent the fraction of the database represented by the corresponding cluster and k is the number of clusters. We focus on models whose components (clusters) are represented by multivariate Gaussians. This choice in motivated by the following result. Any distribution can be approximated accurately with a mixture model containing a sufficient number of components. Data clustering is suitable because clusters are represented by multivariate Gaussians which are compact to represent and easy to integrate with numerical methods and recent efficient methods for clustering large volumes of data have been developed.

In a so-called K-means clustering technique, the data points belong or are assigned to a single cluster. K-means clustering is described in co-pending United States patent application entitled "A scalable method for K-means clustering of large Databases" filed. in the United States Patent and Trademark Office on Mar. 17, 1998 under application Ser. No. 09/042,540 and which is assigned to the assignee of the present application and is also incorporated herein by reference.

A second clustering process suitable for use with the present invention uses a so-called Expectation-Maximization (EM) clustering. E-M clustering is described in an article entitled "Maximum likelihood from incomplete data via the EM algorithm", Journal of the Royal Statistical Society B, vol 39, pp. 1–38 (1977). The EM process estimates the parameters of a model iteratively, starting from an initial estimate. Each iteration consists of an Expectation step, which finds a distribution for unobserved data (the cluster labels), given the known values for the observed data. Copending patent application entitled "A Scalable System for Expectation Maximization Clustering of Large Databases" filed May 22, 1998 under application Ser. No. 09/083,906 describes an E-M clustering procedure. This application is assigned to the assignee of the present invention and the disclosure of this patent application is incorporated herein by reference.

In an expectation maximization (EM) clustering analysis, rather than harshly assigning each data point in FIG. 5 to a cluster and then calculating the mean or average of that cluster, each data point has a probability or weighting factor that describes its degree of membership in each of the K clusters that characterize the data. For the EM analysis used in conjunction with an exemplary embodiment of the present invention, one associates a Gaussian distribution of data about the centroid of each of the two clusters in FIG. 5.

Figure 6:
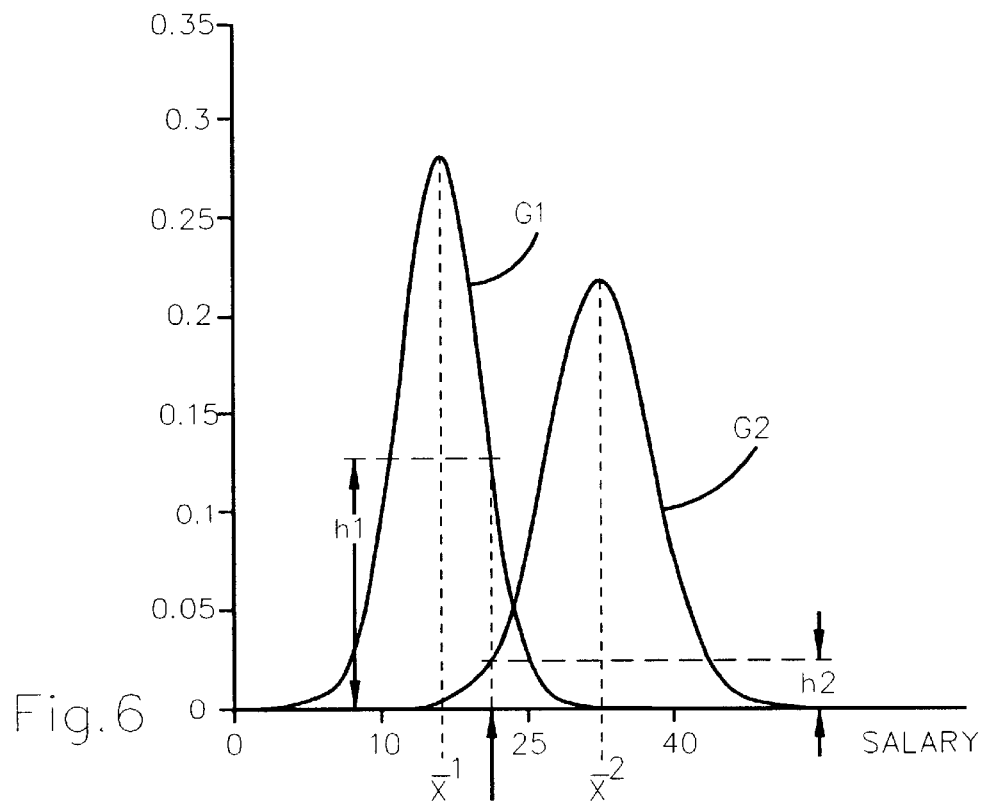
FIG. 6 is a one dimension plot showing a data distribution of data records for two data clusters.

Consider the one dimensional depiction shown in FIG. 6. The two Gaussians G1, G2 represent two clusters that have centroids or means $\bar{x}^1, \bar{x}^2$ in the salary attribute of 16K and 33K per year. The compactness of the data within a cluster is generally indicated by the shape of the Gaussian and the average value of the data points that make up the cluster is given by the mean or centroid. Consider the data point identified on the salary axis of FIG. 6 as the point "X" of a data record having a salary of $22,000. This data point is plotted in the FIG. 5 depiction. The data point 'belongs' to both the clusters identified by the Gaussians G1, G2. This data point 'belongs' to the Gaussian G2 with a weighting factor proportional to h2 (probability density value) that is given by the vertical distance from the horizontal axis of FIG. 6 to the curve G2. This same data point X 'belongs' to the cluster characterized by the Gaussian G1 with a weighting factor proportional to h1 given by the vertical distance from the horizontal axis to the Gaussian G1. We say that the data point X belongs fractionally to both clusters. The weighting factor of its membership to G1 is given by h1/(h1+h2+Hrest); similarly it belongs to G2 with weight h2/(h1+h2+Hrest). Hrest is the sum of the heights of the curves for all other clusters (Gaussians). If the height in other clusters is negligible one can think of a "fraction" of the case belonging to cluster 1 (represented by G1) while the rest belongs to cluster 2 (represented by G2). For example, if h1=0.13 and h2=0.03, then 0.13/(0.13+0.03)=0.8 of the record belongs to cluster 1, while 0.2 of it belongs to cluster 2.

The invention disclosed in the above referenced two co-pending patent applications to Fayyad et al brings data from the database 10 into a computer memory 22 (FIG. 1) and the data mining engine 12 implemented by software running on the computer 20 creates an output model from that data. In a client/server implementation, an application program 14 acts as a client and the data mining engine component 12 as a server. The application program 14 is the recipient of an output clustering model. The clustering model provided by the data mining engine will typically fit in the memory of a personal computer. This will allow the data mining engine 12 to perform the clustering analysis and then transmit this model to a portable (laptop) computer so that the user needing to answer queries based on the data in the database 10 can have access to database summarizations without need to be in communication with the server.

Probability Function

Figure 4A:
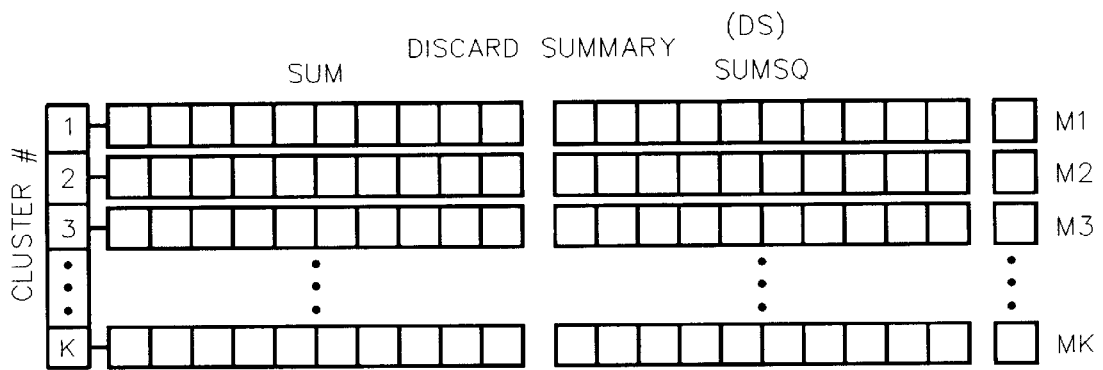
FIGS. 4A–4D illustrate a data structure for storing a clustering model that forms an output of the clustering process depicted in FIG. 3.
Figure 4B:
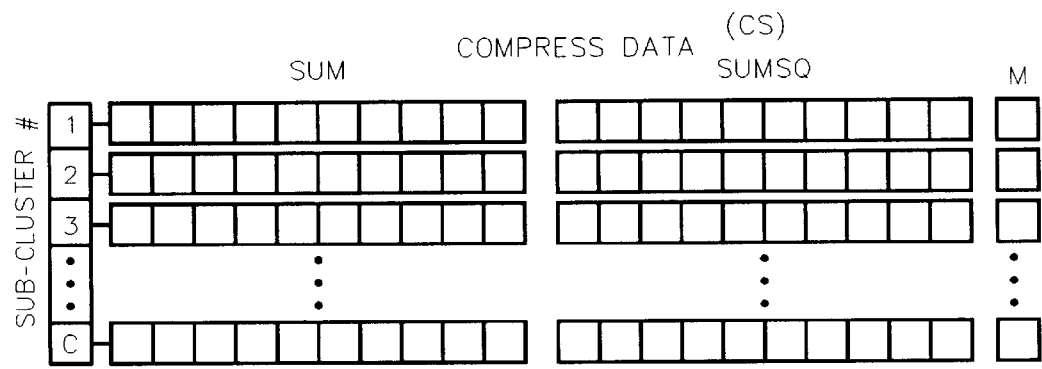
Figure 4C:
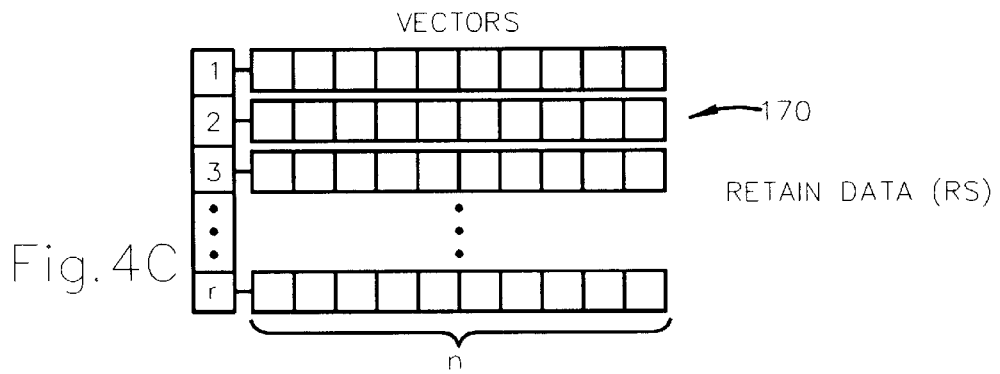
Figure 4D:
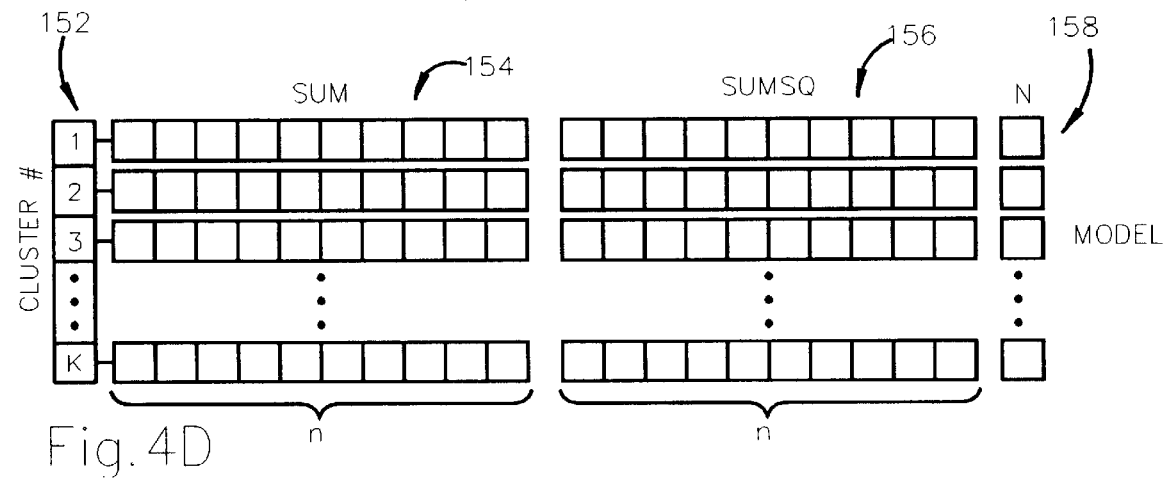

Each cluster in the model is represented or summarized as a multivariate gaussian having a probability density function:

$$p(x) = \frac{1}{(2\pi)^{n/2}\sqrt{|\Sigma|}} e^{(-1/2(x-\mu)^T \Sigma^{-1}(x-\mu))}$$

where $x=(x_1,x_2,x_3,x_4, \ldots, x_n)$ is a n-component column matrix corresponding to a data point in the selected n dimensional space of the database, $\mu$ is the n-component column matrix corresponding to a data structure 154 having the means (averages) of the data belonging to the cluster in each of the n dimensions (designated SUM in FIG. 4D). Sigma ($\Sigma$) is an n-by-n covariance matrix that relates how the values of attributes in one dimension are related to the values of attributes in other dimensions for the points belonging to the cluster. The transpose of a matrix $\Sigma$ is represented by $\Sigma^T$, and the inverse of a matrix $\Sigma$ is represented by $\Sigma^{-1}$. The determinant of a matrix $\Sigma$ is represented by $|\Sigma|$. The covariance matrix is always symmetric.

The number of memory locations or values required to represent each cluster in the cluster model of FIG. 4D is the sum of the following quantities: the number N (one number) indicating the data records summarized in a given cluster. (In K means this is an interger in E-M clustering a floating point number) The dimension n equals the number of items in the SUM data structure (FIG. 4D) and the value $n*(n+1)/2$ values for the covariance matrix $\Sigma$ which give a total of $1+n+[n*(n+1)]/2$ values in all. If the covariance matrix is diagonal (FIG. 4D for example), then there are n numbers in the covariance matrix (SUMSQ in FIG. 4D) and the number of values needed to characterize the cluster is reduced to 1+2n. If there are K clusters, the memory required for the model is K(1+2n).

Figure 3:
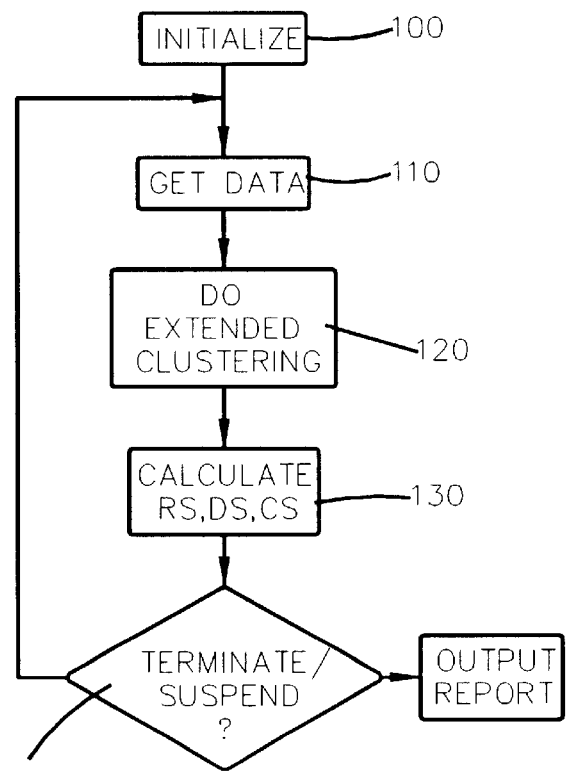
FIG. 3 is a flow chart of a clustering process used in conjunction with an exemplary embodiment of the invention.

FIG. 3 is a flow chart of the process steps performed during a scalable EM analysis of data. It is emphasized that the clustering processes disclosed in the two aforementioned patent applications to Fayyad et al need not be used in practicing the present invention, but that they are representative of suitable clustering processes that are used for clustering large databases having so many records that the memory for storing the records far exceeds the available rapid access memory of a computer that implements the data mining engine 12 for performing the clustering.

A first step of the FIG. 3 scalable clustering procedure is an initialization step 100. This step sets up a number of data structures shown in FIGS. 4A–4D. In accordance with the exemplary embodiment of the present invention, the number of clusters K is determined by an iterative process that is summarized in FIG. 7. Starting conditions for the K clusters are also determined during this initialization step 100. Once this initialization step 100 is performed, the scalable clustering procedure that uses the E-M, K-Means or other suitable clustering process is performed until a stopping point 140 is reached.

Figure 7:
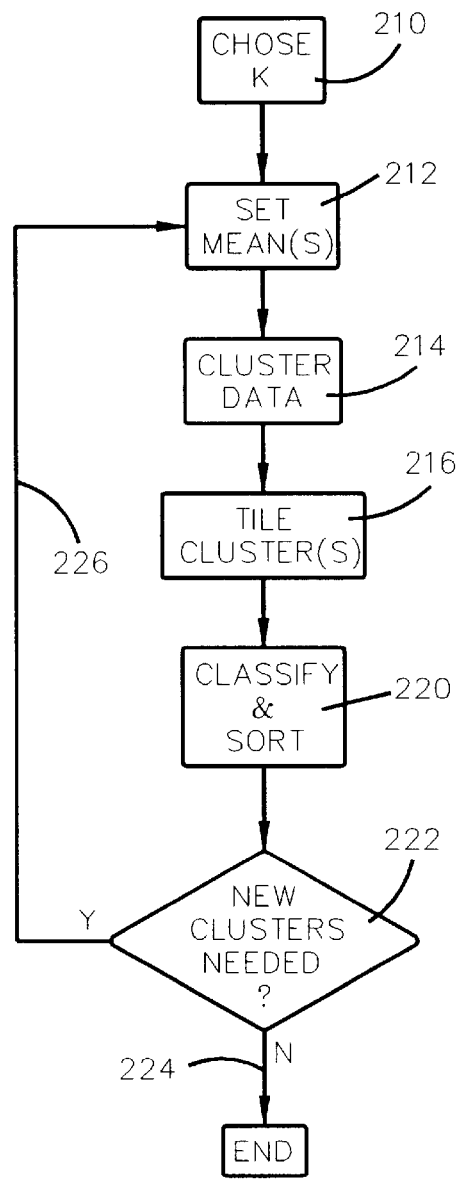
FIG. 7 is a flowchart illustrating a clustering initialization process for use with the FIG. 3 clustering process.

When used with the scalable clustering process of FIG. 3, the initialization process of FIG. 7 selects a starting cluster number, K and determines a starting point for the means or centroids of the K clusters. For smaller databases where it is feasible to repeatedly scan the entire database, the process of FIG. 7 builds a complete cluster model that accurately describes the database. The FIG. 7 process operates by identifying areas (partitions) of multidimensional space that have a higher or lower density of points than is predicted by a current cluster model. The current model is then further refined by growing new clusters in the areas of low or high density so that the new model better fits the data. This improves the density estimation of the clustering and hence improves the accuracy of queries answered using the clustering model.

If memory (MaxMemory) is allocated for the model creation process for at most p cluster values, then the number of clusters is upper bounded by $$\frac{p}{1+n+\frac{n(n+1)}{2}}$$

(in the case of a diagonal covariance matrix this number is $$\left(\frac{p}{1+2n}\right)).$$

In the clustering algorithm that determines the number of clusters, new cluster points are generated only if there is sufficient memory to store the new clusters, i.e., only if the total number of clusters is less than or equal to $$\left(\frac{MaxMemory}{1+n+\frac{n(n+1)}{2}}\right)$$

(or $$\left(\frac{MaxMemory}{1+2n}\right)$$

in the case when cluster have diagonal covariance matrices).

One Dimensional Increasing Cluster Number Example

A cluster initialization example in one dimension (n=1) helps to illustrate these concepts. The process steps for the one dimensional case are extended to multiple dimensions (n>1) for a generalized clustering initialization and choice of K procedure.

Figure 8:
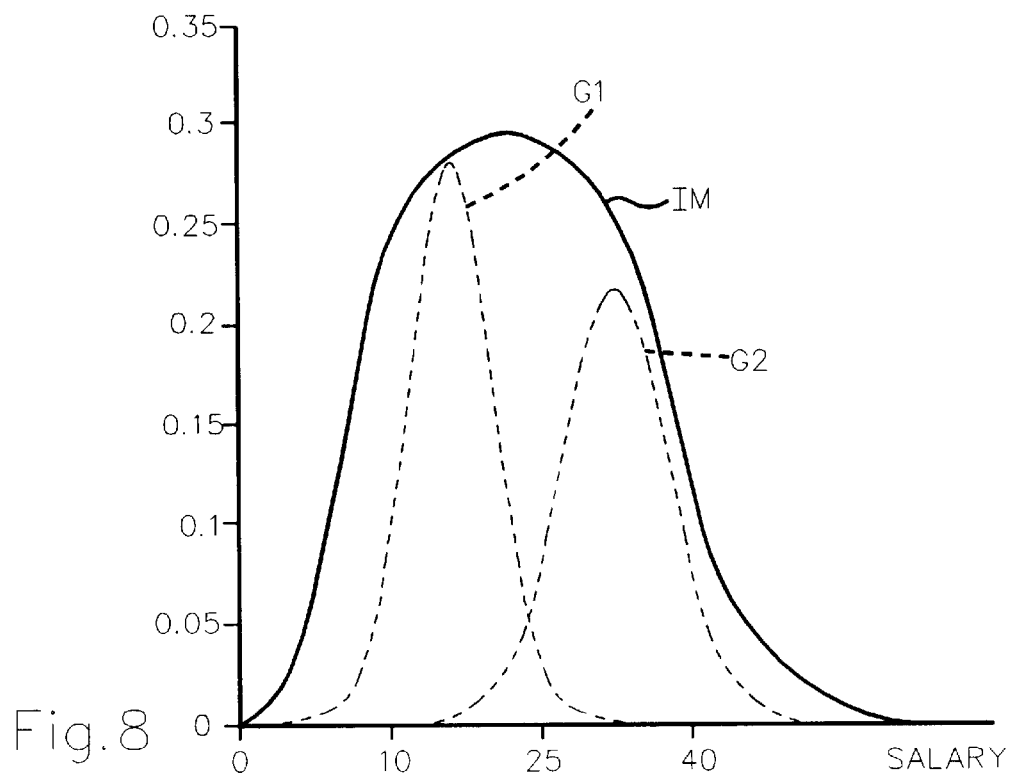
FIGS. 8 and 9 are two one dimensional depictions that help illustrate a tiling process for improving a cluster model of data records stored in a database.
Figure 9:
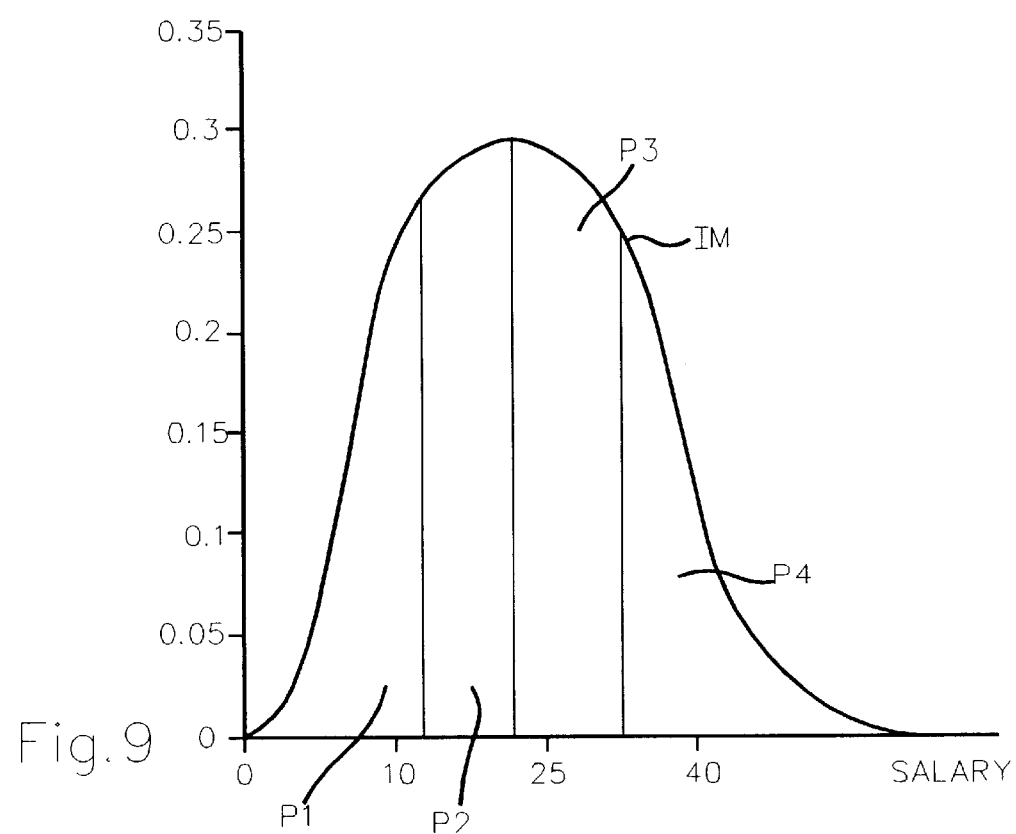

Consider the one dimensional Gaussian IM (initial model) depicted in FIGS. 8 and 9 for the salary attribute. This Gaussian is characterized by a mean (centroid) and a covariance and represents an estimate of the data distribution of the salary attribute of data stored in the database containing employee records such as those from table 1. The covariance is defined from the model data (FIG. 4D) for a given cluster and a given dimension of that model as the relation:

$$\text{Covariance} = \text{SumSq}/M - [(\text{Sum})(\text{Sum})]/M^2$$

The Gaussian IM represents a single cluster and a single cluster would not typically accurately model the data stored in a database made up of real data. It is very common that the data in a real database will be organized in clusters and as seen in FIG. 8 a more accurate depiction of the salary attribute distribution is two clusters represented by the two Gaussians G1 and G2. Starting with the initial distribution IM, how does one reach the two cluster data characterization?

The process of refining the initial Gaussian IM to the more accurate data distribution Gaussians G1, G2is done by partitioning the one dimensional data space of the salary attribute into segments, or sections. Thus, in FIG. 9 the salary data space has been divided into four partitions P1, P2, P3, P4. In the following, the term partitions and tiles are used interchangeably. During the initialization step 100, the data mining engine 12 reads a portion of the data contained within the database 10 and gathers statistics for each of the partitions P1, P2, P3, P4. This allows the data mining engine 12 to compare the statistics from the database with the initial model IM. Table 2 tabulates that comparison for a database sample of 1000 records read from the database 10.

TABLE 2

|  | Partitions | | | |
| --- | --- | --- | --- | --- |
|  | P1 | P2 | P3 | P4 |
| Count from IM Model | 250 | 250 | 250 | 250 |
| Count from Database | 125 | 325 | 300 | 250 |

The data mining engine 12 forms conclusions about the accuracy of the initial model (M) based on the data summarized in Table 2. It is noted that the choice of the number of partitions (P1–P4 in the example) is based upon the number of data points read from the database (1000 in this simplified example) and the number of points chosen for each partition (250 points per partition in the example). Once the number of partitions is fixed the model also fixes the boundaries in the salary dimension for the four partitions. Stated another way, given the initial Gaussian for the model (IM, FIG. 8) and the number of points per partition, the model dictates the boundaries for each of the four partitions. In FIG. 9 three partition boundaries of 12K, 22K, and 32K dollars segment the salary attribute space into the four partitions P1–P4.

The data tabulated in Table 2 indicates how well the model IM fits the data in the database. The data in the initial cluster model (IM) clearly over estimates the data count in the first partition (P1). As the model is refined the number of clusters is adjusted upwardly until the model more accurately represents the data stored in the database. The number of clusters K is increased until the model that is produced (FIG. 4D) occupies the amount of memory allocated to it or until an accuracy criteria described below has been satisfied.

Accuracy Parameters

A number of accuracy parameters are used to control the clustering initialization process of FIG. 7. These accuracy parameters can be adjusted to control the manner in which the process is performed. One parameter used in determining these accuracy parameters is the number of points per attribute partition or tile (NumPointsPerTile) such as the tiles P1–P4 of FIG. 10. An accuracy parameter (TileAccuracy) is the accuracy of each tile. This is the percentage by which the number of points in a tile is allowed to deviate from the expected value (TileAccuracy). An additional accuracy parameter is the probability (as a percentage) of a tile satisfying the accuracy criterion. This percentage (TilePercentage) is the number of tiles of the total number that must satisfy the accuracy criterion for the model to be judged acceptable. In the above simplified example of one cluster and one dimension (the salary attribute) the number of points per tile is 250. A TileAccuracy value of 80% would mean that for a tile to be judged as accurate the number of data points falling within the tile must be above or below the model prediction by no more than 20%. Referring to Table 2, one sees that the first partition P1 is outside the 80% TileAccuracy limit. Assume a TilePercentage of 20%. In the simplified one dimensional example from above the fact that the single partition or tile P1 has been identified means that 25% of the tiles have exceeded the TileAccuracy limit and this in turn means the TilePercentage threshold has been exceeded. Using these thresholds one concludes that the number of clusters K should be increased.

There is a theoretical justification or basis for choosing the accuracy parameters for a given clustering application. The NumPointsPerTile parameter represents the granularity at which clusters are detected. If NumPointsPerTile is large, then clusters are detected at lower granularity while if NumPointsPerTile is low, clusters are detected at a higher granularity.

If the data clusters are represented by gaussians, then TileAccuracy represents the accuracy to which each tile should satisfy the gaussian and TilePercentage gives the percentage of tiles within a cluster that must satisfy the accuracy requirement for the model to be judged suitable. It is assumed that each tile in a cluster represents an equal area under the multivariate (or multi-dimensional) Gaussian for that cluster. The following discussion relates the above parameters and classifies the space of possible parameter settings that make sense.

Consider a Gaussian cluster having N points. The probability (p) of a point being in a given tile is p=NumPointsPerTile/N. The variance of the actual number of points per tile due to a random sampling of N points from a Gaussian distribution of the cluster is Np(1−p). It is assumed that the Gaussian determined by the clustering algorithm has nearly the same parameters as the actual gaussian from which the N points were picked (this assumption is valid for large N). Then, for a confidence interval of TilePercentage and accuracy of TileAccuracy, we derive the relation:

$$\frac{\sqrt{Np(1-p)}}{Np} z\left(\frac{1 - TilePercentage}{2}\right) < 1 - TileAccuracy$$

or equivalently:

$$\sqrt{\frac{1}{NumPointsPerTile} - \frac{1}{N}} \, z\left(\frac{1 - TilePercentage}{2}\right) < 1 - TileAccuracy$$

where the z function is used to determine confidence intervals for binomial distributions. Thus, once we determine the maximum value of N (i.e., the maximum number of points in a cluster) and substitute that value for N, we obtain the required inequality between the input parameters. It should be noted that a high TileAccuracy searches for better quality clusters (assuming they are represented by gaussians) while also running the risk of unnecessarily subdiving lesser quality clusters. On the other hand, a low value of tile accuracy searches for low quality clusters but does not split a cluster that would be better represented as two higher quality clusters. Thus, a tradeoff has to be made in the choice of this parameter. A similar argument holds for TilePercentage. A high value of NumPointsPerTile performs a low granularity checking of a cluster with a gaussian while a low value of NumPointsPerTile performs a high granularity checking. A high value thus favors low quality clusters while a low value favors high quality clusters. If the inequality is not tight, i.e., there is some slack in the inequality, then the amount of slack determines how much a cluster can deviate from the shape of the Gaussian.

A choice of these parameters is made by a database user such as a user interface that allows the user to choose these parameters. By a suitable adjustment of these parameters, the database user can control the accuracy of the querying process. An increase in the accuracy by adjustment of the TileAccuracy percentage may result, however, in a tradeoff in the time it takes to model the database by building a cluster model before the queries can be performed.

Higher Dimensions

The present invention has particular applicability to databases having records of high dimension n where n is ten and greater. For such databases the data cannot be visually depicted and one has little or no sense of how the clusters of such a database might be organized. Choosing a starting cluster number K for such databases is a hard task and can greatly affect the suitability of the cluster model produced by the data mining engine 12.

Let NuniDimensions denote the number of dimensions of the data. We assume for illustration purposes that the data values along each dimension are scaled so that they have mean 0 and variance 1. This is strictly not necessary because the process can be modified to deal with this scaling.

FIG. 7 is a flowchart of the process steps performed during an initialization phase 100 of the scalable clustering outlined in FIG. 3 or alternatively, if the number of records in the database is relatively small, the process of FIG. 7 is used to completely model the database. Initialization 100 begins by setting the cluster number to one (K=1) at a first step 210. The process then calls 212 a function GetClusterMean( ). On a first iteration of the initialization phase 100 this function returns a single cluster in which the mean or centroid along each of the n dimensions is set to the value 0.

A next function ClusterData (DataSource, ClusterMeans) (the parameters DataSource and ClusterMeans are input parameters to the function) clusters 214 data from the DataSource (database 10) using the cluster means returned by the function 212 GetClusterMean( ) as the initial starting seeds. Any standard clustering algorithm, including the K-means, and EM scalable clustering, could be used at this step 214. This function returns a cluster model that is stored in a data structure depicted in FIG. 4D. For large databases the clustering scans only a portion of the database to produce this clustering model. In those instances the FIG. 7 process, when completed, initializes the FIG. 3 scalable clustering procedure. For small databases that will fit in memory or can be easily read and evaluated the entire database is scanned to provide the clustering model. When there is only a single cluster (K=1), the mean shifts during this clustering process and the spread a is stored in the SUMSQ portion of the FIG. 4D data structure.

At a next step, a function TileData(DataSource, NewClusters, AccuracyParameters) 216 is called. This function divides each cluster into equal area tiles. Each tile is of size approximately NumPointsPerTile. The exemplary embodiment of the invention assumes that the clusters are represented by multivariate gaussians with a diagonal covariance matrix. Under such an assumption, the TileData function 216 just has to find the number of partitions for each dimension. The number of points per tile in the cluster would be the number of points in the cluster divided by the number of tiles in that cluster. The process of determining the number of partitions along each dimension must be performed.

The goal is to create partitions along each dimension such that the number of partitions along a dimension is proportional to the standard deviation of the Gaussian in that dimension. This is motivated by the observation that if the variance is very high along a particular dimension, the cluster is not likely to be a good cluster along that dimension.

Let $$s = \sum_{d=1}^{NumDimension} stddev_i$$

be the sum of the standard deviations along the dimensions ($stddev_i$ is the standard deviation along dimension i). Further, let $$r_i = \frac{stddev_i}{s}.$$

The number of partitions along dimension i is given by $(1+r_i) \times d$ where $$d = \left( \frac{N}{NumPointPerTile \times \prod_{d=1}^{NumDimensions} (1+r_i)} \right)^{1/NumDimensions}.$$

The value $(1+r_i) \times d$ may not be always a whole number. This is handled by rounding off this value to the nearest whole number.

The database user may identify in advance certain dimensions of the database attributes that are more important than others. This is represented by a weight vector where the importance of queries along a particular dimension is proportional to the weight of that dimension. This importance is represented by WeightVec(d) where d is a dimension.

The number of partitions along the dimension i is now $(1+r_i \times WeightVec(i)) \times d$ where $$d = \left( \frac{N}{NumPointPerTile \times \prod_{d=1}^{NumDimensions} (1 + r_i \times WeightVec(i))} \right)^{1/NumDimensions}.$$

This provides the appropriate weighting for more resolution along a particular dimension.

Once the clusters have been partitioned or tiled at the step 216, the initialization process 100 first classifies and then sorts the data in the database 10 by calling a function 220 ClassifyData(DataSource, TileInfo). The function 220 scans through the data and determines which cluster each data point belongs to. In the case of a clustering algorithm like EM, a data point may belong to many clusters each with varying probabilities. In this case, a random number is generated and based on the random number, a cluster is picked with likelihood proportional to the membership of the data point to that cluster. As a simple example, if there are four clusters (K=4), a random number from one to four is generated to choose one of the clusters. Once the cluster is chosen, the partition to which the data point d belongs to in each dimension of the cluster is determined.

Suppose that the number of partitions in dimension i for the cluster to which the data point belongs to is $p_i$. Then, the partition to which the data point belongs to in the dimension i is floor($p_i \times N(d[i], \mu_i, \sigma_i)$), where d[i] is the value in the ith dimension of the data point d and $N(d[i], \mu, \sigma_i)$ is the integral of a gaussian having mean $\mu_i$ and variance $\sigma_i$ from $-\infty$ to d[i].

In the case of the simple one dimensional cluster for the salary dimension (FIGS. 9 and 10) $p_i$=4. Assume a data point has a salary of 30K. The integral from $-\infty$ to 30K is evaluated and multiplied by 4 and in this instance assigns the data point or record to the third partition P3. In a data clustering application having multiple dimensions each data point read from the database is evaluated for all dimensions and assigned to an appropriate partition for each dimension.

Let $dp_i$ denote the partition to which the data point d belongs to in the dimension i. The process for calculating a tile number to which the data point belongs is as follows:

1. TileNumber=0
2. CurrentDimension=0
3. TileNumber=TileNumber×$P_{CurrentDimesion}$+$dP_{currentDmensvon}$
4. CurrentDimension=CurrentDimension+1
5. If the CurrentDimension<NumberOfDimensions then go to 3.
6. Return TileNumber The (cluster, tile) pair forms the classification information for a particular data point. The set of all such pairs for all data points is returned by the ClassifyData function. Note, for each data point this process identifies one tile number for the cluster to which the point is assigned.

The calculation of the TileNumber is reversible so long as the number of tiles or partitions are known in each dimension.

A Sort(ClassifiedData) function is then performed. This function sorts the classification information returned by the previous function by cluster order and then by tile number order. This can be performed using a conventional external sort routine.

A GetNewClusterMeans(SortedClassifiedInfo, TileInfo) Function forms part of the decision step 222 that determines an appropriateness of the then current cluster model. This function scans the classified data (which is present in cluster order and tile order). For each (cluster,tile) pair, the number of data points in that tile in the given cluster is determined during the scan. A tile having nd points is judged as being inaccurate if:

abs(nd− NumPointsPerTile)>(1.0− TileAccuracy)NumPointsPerTile

For each cluster, the number of tiles that are inaccurate are tabulated. If the number of such inaccurate tiles exceeds:

(1-TilePercentage)N/NumPointsPerTile, where N is the number of points in the cluster, then the means for a new initialization cluster model are generated. Otherwise, no new clusters are generated for the given cluster. If no new clusters are generated a branch 224 causes the routine 100 to return if a scalable clustering procedure is to be conducted. On a smaller database, however, if no new clusters are generated the clustering process is complete. If new clusters are to be generated, a branch 226 is taken.

For the branch 226 to be taken, the cluster model was judged as inaccurate. The means or centroids for the new clusters are then generated. During the scan of the data, the maximum positive error tile and the maximum negative error tile are determined for each cluster. If there is a maximum positive error tile not satisfying the accuracy criterion, then a new cluster initialization point is picked from that tile. Otherwise, a new cluster initialization point is picked from the maximum negative error tile.

The following psuedo-code procedure outlines how the partition numbers for each dimension are determined from the tile number having maximum error (the partition number in dimension i is $pd_i$).

1. CurrentDimension=0
2. $pd_{CurrentDimension}$=TileNumber_mod_PCurrentDimension
3. TileNumber=floor(TileNumber/$p_{CurrentDimension}$)
4. CurrentDimension=CurrentDimension+1
5. If CurrentDimension<NumberOfDimensions go to 2
6. End The actual value of the cluster initialization point in dimension i (call it $d_i$) is determined as the value such that the integral of the gaussian representing dimension i for the cluster from $-\infty$ to $d_i$ is $$0.5 * \frac{pd_i}{p_i}.$$

Figure 10:
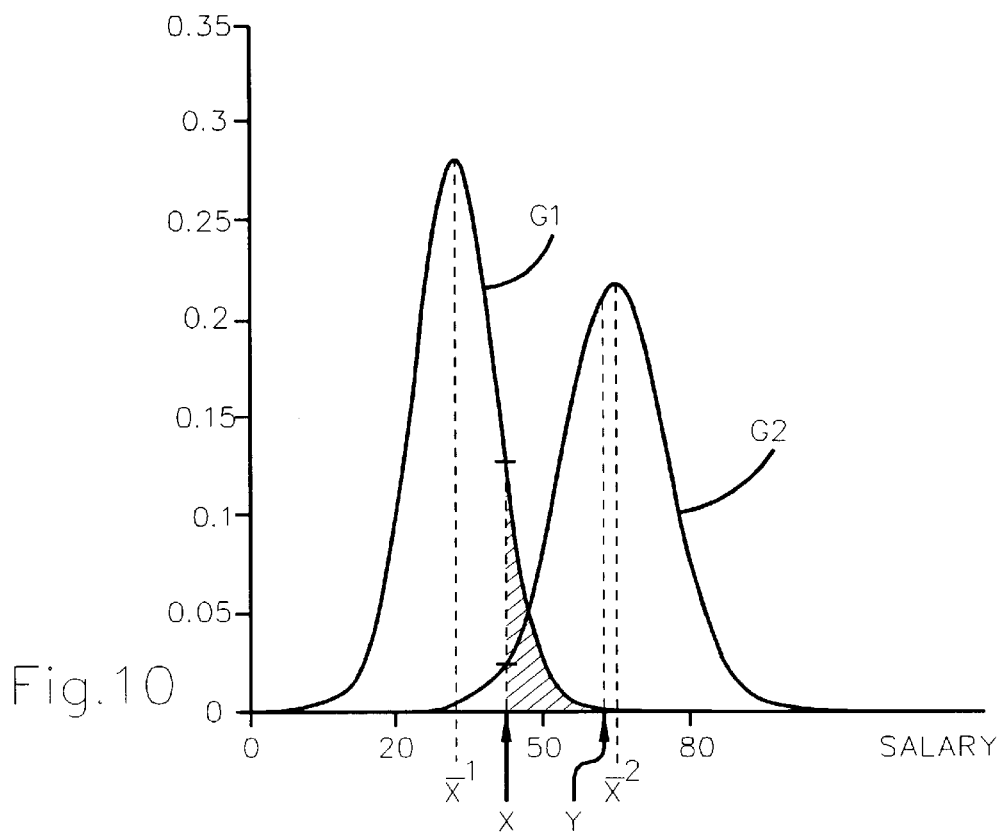
FIGS. 10 and 11 are two one dimensional depictions illustrating use of a cluster model for answering queries.

In the simple one dimensional example of FIGS. 9 and 10, there is one partition P1 that has too low a number of points based on the model for the scanned data from the database. In this example $pd_i$=1 and $p_i$=4. The integral of the Gaussians of FIGS. 9 and 10 from −infinity to +infinity is one. The center for the new cluster (in one dimension) is chosen such that the integral from $-\infty$ to $d_i$ is 5*(¼)=0.125.

Scalable EM Clustering

Once an initial cluster number K and mean or centroid for each of the K clusters has been determined, the initialization routine 100 returns and a scalable clustering process outlined in FIG. 3 is performed. At a step 110 a data sample is brought into a rapid access memory (into RAM for example, although other forms of rapid access memory are contemplated) of the computer 20 schematically depicted in FIG. 1. In general, the data has a large number of fields so that instead of a single dimension analysis, the clustering characterizes a large number of vectors where the dimension of the vector is the number of attributes of the data records in the database. A data structure for this data is shown in FIG. 6C to include a number r of records having a potentially large number of attributes D. A processor unit 21 of the computer 20 next performs 120 an extended EM analysis of the data in memory. The term 'extended' is used to distinguish the disclosed process from a prior art EM clustering analysis. Classical (prior art) EM clustering operates on data records. This implementation works over a mix of data records (FIG. 4C) and sufficient statistics representing sets of data records (FIGS. 4A and 4B). The processor 21 evaluates the data brought into memory and iteratively determines a model of that data for each of the K clusters. A data structure for the results or output model of the extended EM analysis is depicted in FIG. 4D.

In the next step 130 in the FIG. 4 flowchart some of the data used in the present iteration to characterize the K clusters is summarized and compressed. This summarization is contained in the data structures 160, 165 of FIGS. 6A and 6B which take up significantly less storage in memory 25 than the vector data structure 170 needed to store individual records. Storing a summarization of the data in the data structures of FIGS. 6B and 6C frees up more memory allowing additional data to be sampled from the database 10. Additional iterations of the extended EM analysis are performed on this data.

Before looping back to get more data the processor 21 determines 140 whether a stopping criteria has been reached. One stopping criterion that is used is whether the EM analysis is good enough by a standard determined by the user. A second alternative stopping criterion has been reached if all the data in the database has been used in the EM analysis.

The clustering model that is produced by the process depicted in FIG. 4D is characterized by an array of pointers, one each for the K clusters of the EM model. Each pointer points to a vector 154 summarizing a mean for each dimension of the data and a second vector 156 indicating the spread of the data. As the EM model is calculated, some of the recently acquired data that was used to determine the model is compressed. All the data used to model the database is then stored in one of three data subsets. A retained data set 170 is kept in memory 22 for further use in performing the EM analysis. A discarded data set (DS) and a compressed data set (CS) are summarized in the form of sufficient statistics. The sufficient statistics are retained in memory. Regardless of the stopping criteria used to terminate the clustering process of FIG. 3, the model summary of FIG. 4D can be used to perform query analysis.

Answering Queries

Let the n dimensions in the data cube be labeled $d_1$–$d_n$. Also, let the number of clusters be K and let $p_1(x)$ by the gaussian for cluster 1 and $N_1$ be the number of data points in cluster 1. We now consider the three types of queries that are common in decision support applications.

Type 1 Query

The first type of query specifies ranges in dimensions $d_{i1}$ through $d_{im}$, (m<n, i.e. a subset of the n dimensions), the ranges being from $a_r$ to $b_r$ for dimension $d_{ir}$ and asks for the number (count) of data items present in the range. Let the unspecified dimensions be represented as $d_{j1}$ through $d_{jn-m}$. In this case the answer is computed as the sum of the following quantity for each cluster 1.

$$Num(l) = N_l \times \int_{-\infty}^{\infty} \cdots \int_{-\infty}^{\infty} \int_{a1}^{b1} \cdots \int_{am}^{bm} p_1(x)dx_{im} \ldots dx_{i1} dx_{ji} \ldots dx_{jn-m}$$

Figure 11:
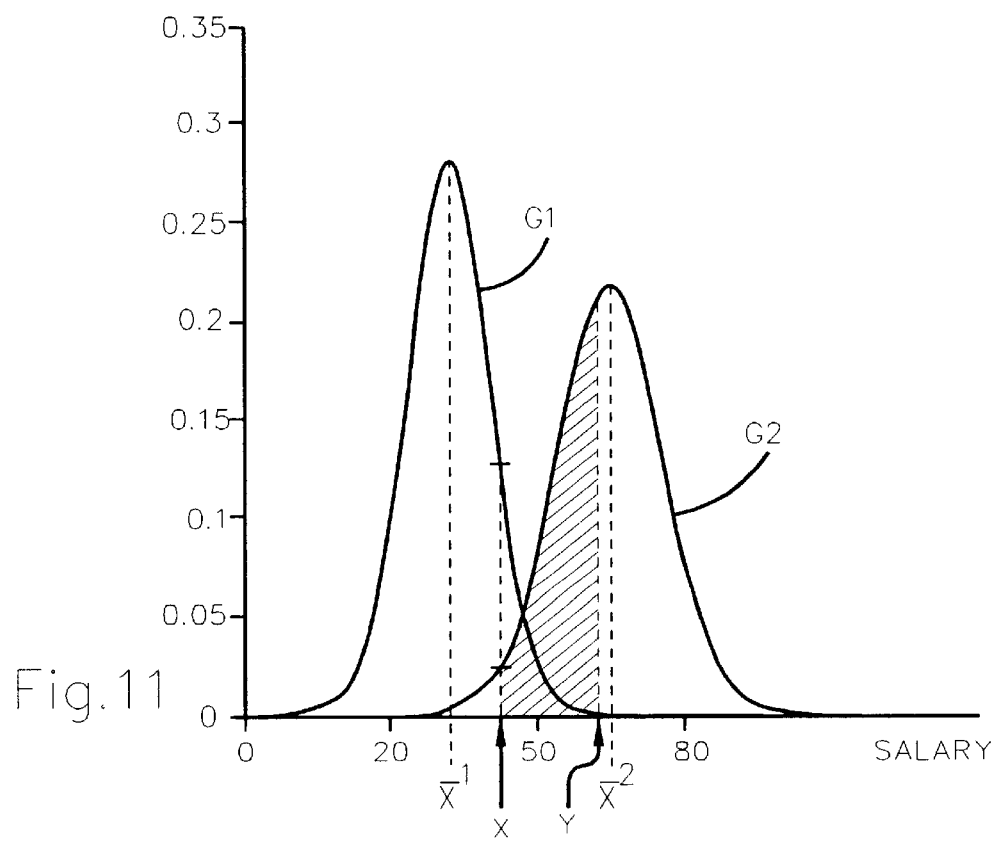

Now consider the one dimensional example of FIGS. 10 and 11. These figures are similar to FIG. 6. They depict two data clusters represented by the two Gaussian data distributions G1, G2. How many employees are there in the company having incomes between of between x=42K and y=58K?

The above integration is straightforward in the case of multivariate gaussians with a diagonal covariance matrix. In this case, the multivariate gaussian p(x) can be written as a product of univariate gaussians for the dimensions of the data and the integral of the product of gaussians can be converted to a product of the integrals of the gaussians. With these simplifying assumptions, the relation for Num(1) becomes:

$$Num(l) = N_l \times \int_{am}^{bm} p_1(x_m)dx_{im} \times \ldots$$
$$\int_{a1}^{b1} p_1(x_1)dx_{i1} \times \int_{-\infty}^{\infty} p_1(x_i)dx_{ji} \ldots \times \int_{-\infty}^{\infty} p_1(x_{n-m})dx_{jn-m}$$

Under the simplifying assumption, the integrals from – to + infinity for the dimensions not involved in the range queries evaluate to one. The remaining terms are univariate integrals over the dimensions $d_{i1}$ to $d_{im}$.

Consider the depiction of FIG. 10 which illustrates two gaussians corresponding to two clusters over the dimension of salary. To evaluate the query of how many employees have salary in the range from 42K to 58K. These range boundaries are designated as 'x' and 'y' on FIG. 10. There is one dimension (salary) and there are two clusters. Consider the contribution from cluster one:

$$Num(1) = N1 \times \int_{42k}^{58k} G1 dx \times (otherterms)$$

The value of 'otherterms' in this integration is one so that the value of Num(1) evaluates to the number N1 for the first cluster times the integral represented by the shaded area on FIG. 10.

A similar integration is needed for the second cluster characterized by the gaussian G2. This result is:

$$Num(2) = N2 \times \int_{42k}^{58k} G2 dx \times (otherterms)$$

This is the number N2 times the integration which is the shaded area under the G2 gaussian in FIG. 11. The result of the query of the number of people is Num(1)+Num(2).

Type 2 Query

This query specifies ranges in dimensions $d_{i1}$ through $d_{im}$, the ranges being from a, to $b_r$ for dimension $d_{ir}$ and asks for the sum of data items present in the range. Let the unspecified dimensions be represented as $d_{j1}$ through $d_{jn-m}$. The answer is computed as the sum of the following quantity for each cluster 1.

$$Sum(l) = N_1 \times \int_{-\infty}^{\infty} \cdots \int_{-\infty}^{\infty} \int_{a1}^{b1} \cdots \int_{am}^{bm} x_s \times p_l(x) dx_{im} \cdots dx_{il} dx_{ji} \cdots dx_{jn-m}$$

For the one dimensional example of FIG. 7 a query of this type would be: What is the total company payroll paid by the company for employees making between 42K and 58K?

Type 3 Query

The third query asks for the average of the values in dimension ds for the data items present in the range. The answer is computed as the ratio of the result of the query that sums the values in dimension d, in the specified range (query of type 2) and the result of the query that finds the number of data points in the specified range (query of type 1). This query would yield the average salary for the people whose salaries fall between 42K and 58K.

The above assumes that only one range selection is specified along each dimension. Disjunctive queries are easily transformed to sums over multiple ranges. Another common type of query is a "cross-tabulation", where multiple ranges are specified along each dimension. Thus, a query may require the number of data points for every combination of ages in the ranges 10–20, 20–30 and 30–40 and salaries in the range 50K–60K, 60K–90K and 90K–120K. Rather than evaluating all combinations (in this case, there are nine) as separate queries, integrals corresponding to sub-queries may be cached and re-used. Thus, in the current example, the integral for the age ranges 10–20, 20–30 and 30–40 would be performed exactly once for the entire query (similarly for the integration for the salary ranges).

Alternate Embodiment

The discussion thus far has included a clustering model such as the model of FIG. 4D. The clustering processes described in the Fayyad et al copending patent applications employ two other data structures referred to as DS and CS in FIGS. 4A and 4B. Individual records are stored in computer memory as vectors and are referred to as an RS data set (FIG. 4C). The database records in the RS dataset do not 'fit' within any of the clusters by criteria defined by the clustering process. An alternate embodiment of the invention is premised upon the availability of these supplemental data structures and does not use the model of FIG. 4D.

The data that is summarized in the data structure DS are records that are most appropriately summarized as belonging to one of the clusters. One can determine a Gaussian function g(x) for the data set DS in a manner analogous to the technique for the model since the diagonal covariance matrix entries (SUMSQ) are available for each of the K clusters. The data structure of CS contains subclusters of data that do not fit well within the clustering but are treated as subclusters, not associated with any of the K clusters. The CS sturctures also include a diagonal covariance matrix entry (SUMSQ) for each of the subclusters C within CS. This enables a function g(x) to be determined for each of the subdlusters. The vector data of RS is treated as individual records and is not compressed.

Consider a range query seeking a count of the number of records in the database falling within the range. This is type 1 of the three type of queries described above. A gaussian g(D) associated with the data structure DS is determined and the integration over the g(D) function performed to determine the cluster's contribution to the count. For the ith cluster call the results of the integration $AD_i$. A gaussian g(C) for each of the C clusters in the subcluster data structure CS is also determined. For the jth subcluster call the results of the integration over this gaussian $AC_j$. Note that each cluster in DS has a number $M_i$ of records corresponding to the number of records compressed in that cluster and each subdluster in CS has a number Mj of records corresponding to the number of records compressed in that subcluster. The answer to the count query is given by:

$$Count = \sum_{i=1}^{K} AD_i \times M_i + \sum_{j=1}^{C} AC_j \times M_j + |RS_A|$$

$RS_A$ is the number of items in RS fall within the bounds of the range query. The sum and average values of records within the range are computed in an analogous fashion.

Extensions

In working with the above three types of queries, we have identified two extensions to the fundamental processes described above that arise using the E-M technique outlined in FIG. 3. A first problem concerns outlier data points. These data points are points that are far away from the means of all the K clusters in at least one of the D dimensions. These data points are not accounted for by any of the clusters in the FIG. 4D model although they do contribute to that model. A second problem relates to the fact that the Gaussian characterized by the SUMSQ data structure 156 for a given cluster may not approximate an idealized Gaussian.

We have discovered two solutions to the outlier problem. Outliers are first identified by calculating the distance of each data point from the mean of the cluster. Formally, a data point $x=(x_1, X_2, X_3, X_4 \ldots x_n)$ is an outlier if for any cluster C, there exists a dimension Di such that $(x_i-\mu_i)/\sigma_i > \xi$. $\mu_i$ and $\sigma_i$ are the means and variances for the cluster in the ith dimension respectively and $\xi$ is a constant that can be set to values greater than 2. Higher values $\xi$ imply a stricter condition for outliers. If the number of outliers is small enough that they can be stored in memory without exceeding a specified memory limitation, then these outliers are stored as vector data along with the cluster information (outlier data is stored in structure RS, FIG. 4C in the E-M procedure discussed above) In this circumstance the query involves the integration over the gaussians as well as an additional term that takes into account the outliers. During the last classification of the data (in the ClassifyData function 220) before the termination of the FIG. 7 process, as many outliers as possible, up to a maximum of NumUnusualPoints, are identified. More precisely, suppose the amount of memory expended for storing an outlier is n and the number of clusters identified is c. Then the numberofoutliers, no, is $$\text{Max}\left( \frac{MaxMemory - c\left(1 + n + \frac{n(n+1)}{2}\right)}{n}, NumUnusualPoints \right)$$

$$\text{Max}\left(\frac{MaxMemory - c(1+2n)}{n}, NumUnusualPoints\right)$$

in the case of clusters having diagonal covariance matrices). The outliers are identified as follows. Let $l_i(p)$ denote the likelihood of a point p belonging to cluster i. Further, let $l(p)=\max_{1 \leq i \leq c}(l_i(p))$. Then the no points with the least value of l(p) are labeled the outliers. The mean and variance of the clusters that they belong to are updated to reflect the fact that they are outliers and are no longer members of those clusters.

A second approach would cluster the outliers that satisfy the above criteria and perform the above integrations over the resulting gaussians.

In the case where the data distribution within a cluster is not strictly gaussian, we identify the regions that are more dense than the probability function of a true gaussian would predict. This is achieved by dividing each dimension within the range of the cluster into equal width histograms. By subtracting the expected number of data points based on a normal gaussian from the values obtained from the model, it is possible to identify regions of non-gaussian data distribution. Once the regions of non-gaussian data distributions are identified, the data in these regions is reclustered and the number of clusters increased. The goal is to increase the number of clusters to achieve better gaussian distributions for the increased number of data clusters. In the above case of outliers, when the outliers are clustered they become additional (presumably guassian) clusters that can be treated as an increased number of data clusters.

Cost Estimates

Denote by C(n) the time to cluster data in n dimensions (assuming that the other parameters of dimensionality and the size of the data set are some constant). Since the cost of most clustering algorithms scale linearly with the number of dimensions, we have the equivalence C(mn)=mC(n). Further, assume that the cost for the functions TileData, ClassifyData and Sort are negligible compare to the cost for ClusterData. This is a typically valid assumption because the TileData, ClassifyData and Sort are computationally efficient functions that require just few passes over the data.

Denote the actual number of clusters in the data by K. If we assume that the cardinality of NewClusterPoints doubles at each iteration until it equals K (i.e., on the average, each cluster splits once every iteration), then the cost of the algorithm can be given by the summation

C(1)+C(2)+C(4)+C(8)+. . . +C(K)

which is at most equal to (2K−1)C(1). By using the equivalence above, we can conclude that the cost of the algorithm is at most 2C(K), which is twice the cost of the optimal clustering.

Discrete Attributes

The data contained in Table 1 has attributes that are continuous so that, for example, a given attribute could be compared with that same attribute from other data records. It makes sense to compare one employee's salary with another. Consider the data contained in the table 3 list of sample records, below:

TABLE 3

| Employee ID | Sex | Employment Status |
|---|---|---|
| XXX-XX-XXXX | Male | FullTime-Salaried |
| YYY-YY-YYYY | Female | FullTime-Hourly |
| ZZZ-ZZ-ZZZZ | Female | Part-time |
| QQQ-QQ-QQQQ | Male | Contract |

The 'Employment Status' field or attribute of table 3 is a discrete attribute. Each record in the database has a value for this discrete attribute selected from an enumerated list of four possible values for that field. Similarly, the 'Sex' field falls within the enumerated list of either male or female. While these two examples contain small values for possible discrete values, the list could include hundreds of such values.

Consider a cluster initialization process for data records having only discrete attributes. The three accuracy parameters used in clustering data records having continuous valued attributes have analogous counterparts for discrete attribute clustering. The tiling method, however, is somewhat different.

Table 4 below contains a tabulation of probabilities for the discrete attributes for two different data clusters (Cluster#1 and Cluster#2) having the two discrete attributes of 'sex' and 'employment status'.

TABLE 4

| | Male | Female | Fulltime Salaried | Fulltime Hourly | Contract | Part Time |
|---|---|---|---|---|---|---|
| Cluster #1 | .6 | .4 | .45 | .15 | .20 | .20 |
| Cluster #2 | .35 | .65 | .15 | .10 | .35 | .40 |

A variable designated 'NumDimensions' denotes the number of discrete dimensions of the data. In table 4, this variable is 2.

An initialization process similar to the FIG. 7 process described previously for continuous attributes is also executed for the discrete attributes. The functions described for the continuous case have analogous counterparts in the discrete case. A function analogous to the step GetInitialClusterMean( ) 212 of FIG. 7 is performed. During the first iteration of the discrete attribute initialization process 100 a single cluster is returned having equal probabilities for each of the discrete dimensions. For the two discrete dimensions of Table 4 one has:

| | Male | Female | Fulltime Salaried | Fulltime Hourly | Contract | Part Time |
|---|---|---|---|---|---|---|
| StartCluster | .5 | .5 | .25 | .25 | .25 | .25 |

A ClusterData(DataSource, ClusterMeans) Function clusters data from the DataSource (database 10) using these cluster probabilities as the initial starting seeds. The Kmeans, or EM Scalable clustering for discrete attributes can be used. This function returns clusters probabilities determined as a result of the clustering.

A function TileData (DataSource, NewClusters, AccuracyParameters) divides the attribute probability table up into approximately equal size tiles (unlike the case of continuous attributes, where it is divided into equal size tiles). Each tile is sized to define approximately NumPointsPerTile. The TileData function determines the tiling by finding the number of partitions per dimension. The total number of tiles in the cluster would be the product of the number of partitions assigned to the n discrete attribute dimensions. The number of points per tile varies depending on how even the partitions are along each dimension. When there is only one cluster, all points read from the database belong in this starting cluster.

The function TileData (DataSource, NewClusters, AccuracyParameters) determines the number of partitions along each dimension. The process creates partitions along each dimension such that the number of partitions along a dimension is proportional to the entropy along that dimension. This step is motivated by the observation that if the entropy is very high along a particular dimension, the cluster is not likely to be a good cluster along that dimension.

Let $$e = \sum_{d=1}^{NumDimensions} entropy_i$$

be the sum of the entropies along the dimensions (entropy$_i$ is the entropy along dimension i). Further, let $$r_i = \frac{entropy_i}{e}.$$

The number of partitions along dimension i is given by $(1+r_i) \times d$ where $$d = \left( \frac{N}{NumPointsPerTile \times \prod_{d=1}^{NumDimensions} (1+r_i)} \right)^{1/NumDimensions}.$$

The value $(1+r_i) \times d$ may not be always a whole number. This is handled by rounding off this value to the nearest whole number. In case the value exceeds the number of distinct values in that dimension, the number of partitions is set equal to the number of distinct values in that dimension.

The TileData( ) function next determines which values belong to which partitions along a dimension. One suitable technique is given by the following allocation process. Let p denote the number of partitions along a dimension.

1. expected_probability=1/p
2. Sort the probabilities of all values in descending order
3. Set the probability of all partitions to 0

While not all values have been processed do

4. Get the value having the highest probability that has not been processed so far
5. Get the partition that has the least probability
6. Add the selected value to the selected partition
7. Update the probability of the selected partition to include the probability of the added value End while Consider the example of cluster #1 from table 4. Assume the probabilites in the 'Employment Status' attribute are to be assigned to 2 tiles so p=2. The expected probabilty at step one is 1/p=0.5. At step two the probabilities are sorted a) Salaried=0.45, b) Part Time=0.20, c) Contract=0.20, and d) Fulltime Hourly=0.15. At step three, the probability for partitions #1=probability for partition #2=0.

At step four in the while loop, the value 'Salaried' is chosen since it has the highest probability. Both partitions have equal probability=0. Assign a probability to tile #1 of 0.45 at step seven and go back to start of the while loop. On a next iteration one of the 0.20 probability values of the 'Employment status' attribute is assigned to the second tile. Continuing on through the process one has the following assignments.

| Tile #1 | Tile #2 |
|---|---|
| FullTime Salaried (.45) | FullTime Hourly (.20) |
| | Contract (.20) |
| | Part Time (.15) |
| Probabilitiy = 0.45 | Probability (combined) = 0.55 |

Two functions of GetClassifyData(DataSource, TileInfo) and the Sort (ClassifiedData) Function are identical to the corresponding function for the case of continuous valued attributes.

A GetNewClusterMeans (SortedClassifiedInfo, TileInfo) function scans the classified data (which is present in cluster order and tile order). Thus for each (cluster,tile) pair, the number of data points in that tile in the given cluster can be easily determined during the scan. For each cluster, the number of tiles that are inaccurate (i.e., have number of data points, nd, such that NumPointsInTile>nd+(1-TileAccuracy) NumPointsInTile or NumPointsInTile <nd−(1-TileAccuracy)NumPointsInTile) are determined. Here NumPointsInTile represents the number of points in a tile of a cluster as predicted by the probability distribution of values in the cluster. If the number of such inaccurate tiles exceeds (1-TilePercentage)NumTiles, where NumTiles is the number of tiles in a cluster, then the probabilities for a new initialization cluster are generated. Otherwise, no new clusters are generated for the given cluster and K, the number of clusters is set.

Probabilities for a new cluster initialization point are generated as follows. During the scan of the data, the maximum positive error tile and the maximum negative error tile are determined for each cluster. If there is a maximum positive error tile that does not satisfy the accuracy criterion, then a new cluster initialization point is created from the original cluster probability distribution by increasing the probability of data values in the maximum positive error tile and decreasing the probability of other values. Otherwise, a new cluster initialization point is created from the original cluster probability distribution by decreasing the probability of data values in the minimum positive error tile and increasing the probability for other values.

A typical database 10 contains records that have both continuous and discrete fields or attributes. In accordance with the exemplary embodiment of the invention the FIG. 7 process can also be used for this situation. The accuracy parameters are identical to the case of continuous attributes (as well as discrete attributes). The only additional parameter required is a factor c, 0.0<c<1.0, which signifies the emphasis given to the continuous dimension (a low value of c implies less emphasis to continuous valued dimensions while a high value implies more emphasis). In this case, all the steps remain essentially the same except for TileData. For a cluster with weight N, if the value of $$c < \frac{NumPointsPerTile}{N + NumPointsPerTile},$$

then c is set to $$\frac{NumPointsPerTile}{N + NumPointsPerTile}.$$

Similarly, if $$c > 1.0 - \frac{NumPointsPerTile}{N + NumPointsPerTile},$$

then c is set to $$1.0 - \frac{NumPointsPerTile}{N + NumPointsPerTile}.$$

Now, the continuous dimension are tiled with the number of points per tile set to $$\sqrt{\frac{(1.0 - c) \times N \times NumPointsPerTile}{c}},$$

while the discrete dimensions are tiled with the number of points per tile set to $$\sqrt{\frac{c \times N \times NumPointsPerTile}{(1.0 - c)}}.$$

Computer System

Figure 1:
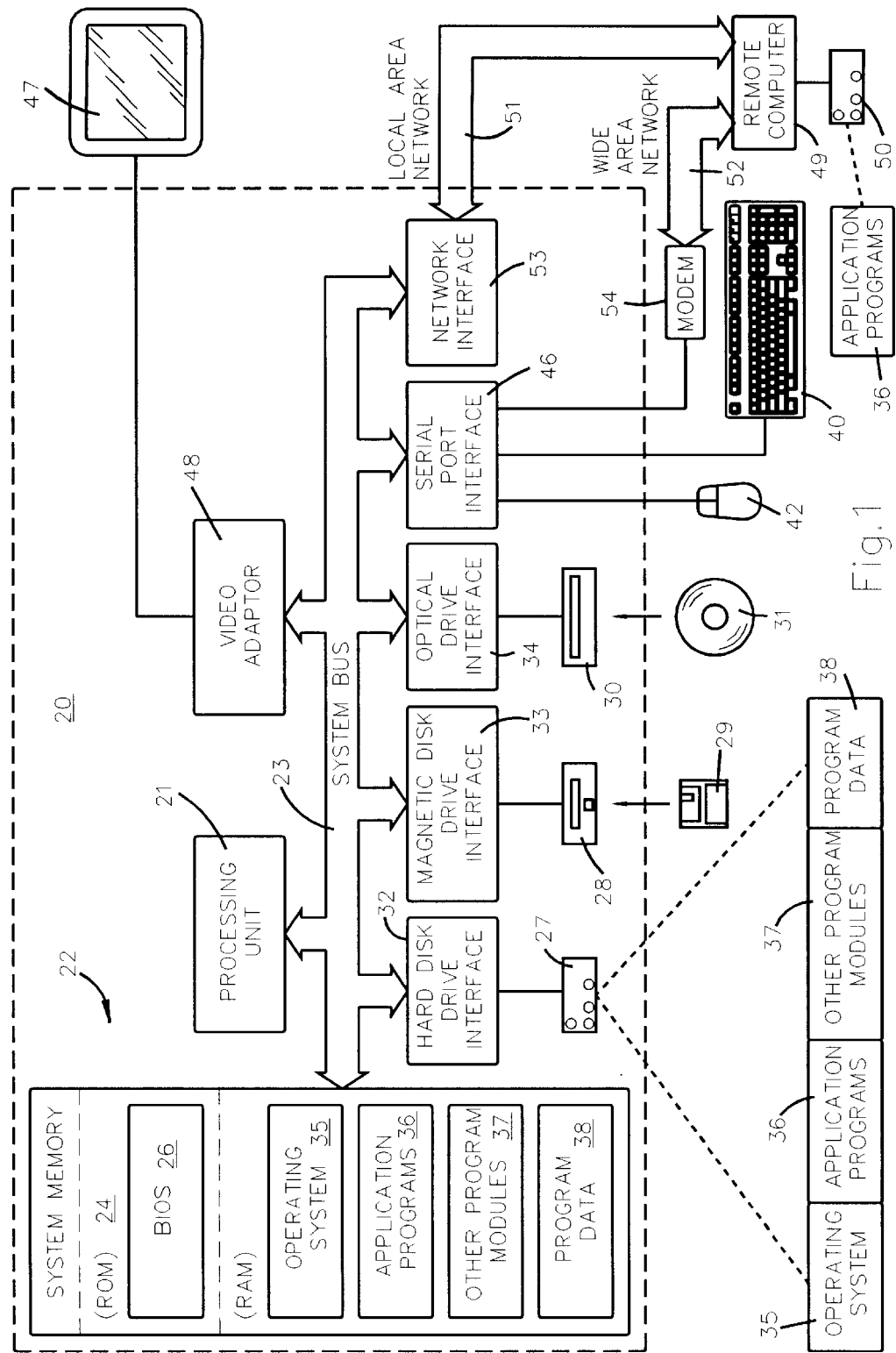
FIG. 1 is a schematic depiction of a computer system for use in practicing the invention.

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

The present invention has been described with a degree of particularity. The use of a clustering process as disclosed in the three Fayyad et al pending patent applications referenced above is optional. It is therefore appreciated that the invention is intended to include all modifications and alterations falling within the spirit of scope of the appended claims.

We claim:

1. A method of querying a database containing data records stored in the database comprising the steps of:

a) clustering data from data records having multiple dimensions that are stored on a database to provide an initial cluster model having an initial probability distribution describing data records in the database;

b) comparing the initial probability distribution with a representative sample of records in the database to determine a sufficiency of said initial probability distribution;

c) modifying the cluster model to provide an adjusted cluster model that characterizes the data in the database, said modifying step performed by finding a region within an attribute space of the data records of high discrepancy between the initial cluster model and a data sample gathered from the database and increasing the cluster number of the cluster model and reclustering at least a portion of the data in the database to produce the adjusted cluster model to reduce discrepancies between the initial probability distribution and data sample from the database; and d) determining a sum or a count of data records from the database falling within specified ranges of the multiple dimensions by integrating a functional representation based on the probablity distribution of the adjusted cluster model over the ranges.

2. The method of claim 1 wherein the functional representation excludes certain data records by identifying outlying data records as not falling within a data cluster.

3. The method of claim 2 wherein the step of determining a sum or a count total adds contributions from the outlying data records to the results of the integrating step.

4. The method of claim 1 wherein the step of providing the functional representation is performed by a clustering step that results in a cluster model having a cluster number K and wherein said cluster number K is adjusted when modifying the cluster model.

5. The method of claim 1 wherein the cluster model is adjusted by comparing the functional representation of the cluster model with data read from the database and improving the functional representation based on the cluster model by increasing the number of clusters based on said comparison.

6. Apparatus for querying a database containing data records comprising:

a) means for providing a functional representation of data clustering for multiple data records stored on a database;

b) means for adjusting a fit between the functional representation and the data in the database to provide a more accurate functional representation of the data clustering by segmenting clusters into cluster segments and comparing an expected data density in the cluster segments based on the initial cluster model with an observed data density of data gathered from the database;

c) means for selecting ranges over dimensions of the data for determining a sum or a count of data records from the database falling within the ranges; and d) means for determining the sum or the count of data records from the database that fall within the selected ranges by integrating the functional representation from each cluster of a multiple number of clusters over the ranges.

7. The apparatus of claim 6 wherein the means for determining calculates both the sum and the count and further includes means for determining a ratio to find the average value of data records over the ranges.

8. The apparatus of claim 6 additionally comprising a user input for controlling accuracy parameters for making the comparison between the cluster model and sampled data.

9. Data mining apparatus for querying a database containing data records comprising:

a) a memory device for storing a database comprising multiple data records organized into data fields having a dimension n for storing data record items;

b) a computer having one or more processing units for executing a stored computer program, said computer including a rapid access memory store; and c) an interface for coupling the memory device for storing the database to the computer to allow records to be retrieved from the database; wherein d) said computer executing a stored program having software components including i) a component for providing a first data clustering model for multiple number of data records stored on a database, sampling data from the database, and producing an updated cluster model based on a comparison between the first data clustering model and the sampled data; ii) a component for selecting ranges over dimensions of the data for determining a sum or a count of data records from the database falling within the ranges; and iii) a component for integrating a functional representation based on the updated cluster model from each cluster over the ranges to determine the sum or the count of data records from the database that fall within the selected ranges;

wherein an amount of the computer's rapid access memory store is allocated for storing outlying data records determined not to fit within any of the K clusters which are counted separately when determining the sum or the count.

10. The apparatus of claim 9 wherein execution of the stored program provides said functional representation by clustering data into a number of clusters K, and wherein said clustering step is performed by allocating an amount of the computer's rapid access memory store for storing a cluster model.

11. A method of querying data records containing continuous attributes that are stored in the database; said method comprising the steps of:

a) defining a data cube over which to query the database by selecting ranges over one or more of the continuous attributes of the data records in a database;

b) providing a functional representation of data clustering from data records stored in the database; said functional representation identifying a distribution probability of said data records by the steps of:

i) performing an intial clustering of data to provide an initial cluster model;

ii) determining regions of an attribute data space where the initial cluster model does not accurately characterize data in the database; and iii) reclustering the data to produce a second cluster model which more accurately characterizes the data of the regions of the attribute data space found to not accurately charactaerize data in the database; and c) determining a count of data records from the database that fall within the data 16 cube by integrating the functional representation of the second cluster model over the selected rangs.

12. The method of claim 11 additionally comprising the step of summing attribute contributions by integrating the value of the functional representation over the data cube.

13. The method of claim 11 wherein the clustering step produces a cluster model comprising a covariance matrix for each of K clusters within the clustering model.

14. The method of claim 11 wherein the step of reclustering the data increases a cluster number K to provide a better cluster model that more accurately represents the data in the database.

15. The method of claim 14 wherein one or more regions of the attribute data space not accurately characterizing the data are chosen as cluster means in the second cluster model.

16. The method of claim 15 wherein the functional representation comprises a mixture model probability density function of the form:

$$Pr(x) = \sum_{\lambda=1}^{k} W_\lambda, Pr(x|\lambda).$$

having mixture weights $W_1$ which represent a fraction of the database represented by a data cluster and wherein the number k is the number of such database clusters.

17. A computer-readable medium having computer executable instructions for performing steps comprising:
 a) clustering data from data records having multiple dimensions that are stored on a database to provide an initial cluster model having an initial probability distribution describing data records in the database;
 b) comparing the initial probability distribution with a representative sample of records in the database to determine a sufficiency of said initial probability distribution;
 c) modifying the cluster model to provide an adjusted cluster model that better characterizes the data in the database, said modifying step performed by finding a region within an attribute space of the data records of high discrepancy between the initial cluster model and a data sample gathered from the database and increasing the cluster number of the cluster model and reclustering at least a portion of the data in the database to produce the adjusted cluster model to reduce discrepancies between the initial probability distribution and data sample from the database; and
 d) determining a sum or a count of data records from the database falling within specified ranges of the multiple dimensions by integrating a functional representation based on the probability distribution of the adjusted cluster model over the ranges.

18. The computer readable medium of claim 17 wherein the determining step limits some but not all of the attributes to specific ranges and wherein the integrating step for continuous attributes not limited to a range is performed over an entire range of said attributes.

19. The computer readable medium of claim 18 wherein an additional cluster is added by finding a region within an-attribute space of the data records of high discrepancy between the initial cluster model and a sample of data gathered from the database.

20. The computer readable medium of claim 17 wherein the determining step limits some but not all of the attributes to specific ranges and wherein the integrating step for continuous attributes not limited to a range is performed over an entire range of said attribute.

21. The computer readable medium of claim 17 wherein the functional representation excludes certain data records by identifying outlying data records as not falling within a data cluster.

22. The computer readable medium of claim 21 wherein the step of determining a sum or a count total adds contributions from the outlying data records to the results of the integrating step.

23. For use with a data mining system for evaluating a database made up of data records having multiple attributes; a clustering process comprising the steps of:
 a) choosing a first cluster number to use in clustering data contained in a database;
 b) clustering the data records from the database using the first cluster number to produce a database clustering model;
 c) evaluating the database clustering model by identifying regions wherein a density of data records in the database differs from data distributions predicted by the database clustering model by;
  i) dividing an attribute space of the database into multiple partitions;
  ii) assigning a specified number of partitions to each of the multiple data record attributes based upon the database clustering model; and
  iii) determining a density of data records within the multiple partitions to evaluate the sufficiency of the database clustering model; and
 d) based on the identification of said regions, adjusting the cluster number and again clustering the data within the database to produce a subsequent database clustering model having a different cluster number.

24. The computer readable medium of claim 23 wherein the cluster model is adjusted by comparing the functional representation of the cluster model with data read from the database and improving the functional representation based on the cluster model by increasing the number of clusters based on said comparison.

25. The method of claim 23 wherein the attribute space of the database is divided into roughly equal segments based on the pre-established database clustering model.

26. The method of claim 23 wherein the total number of partitions into which the database attribute space is divided is determined from a desired number of data points per partition and the number of data records from the database used while clustering the data records to form the database clustering model.

27. The method of claim 23 wherein the step of determining a density of records is performed by scanning the database and assigning data records to different partitions and then comparing a count of data records assigned to a partition with a calculated count based upon the existing database clustering model.

28. The method of claim 26 wherein the total number of partitions into which the database attribute space is divided is determined from a desired number of data points per partition and the number of data records from the database used while clustering the data records to form the database clustering model.

29. The method of claim 23 wherein the database is made up of records having both discrete and continuous data attributes and wherein the partitions are assigned to the attributes based upon an entropy value for the attribute from the existing database clustering model.

30. The method of claim 29 wherein the step of changing the cluster number is performed by ranking differences between the assigned data records and the calculated count for the multiple partitions into which the database attribute space is divided.

31. The method of claim 26 wherein the database is made up of records having both discrete and continuous data attributes and wherein the partitions are assigned to the attributes based upon an entropy value for the attribute from the existing database clustering model.

32. The method of claim 23 wherein the step of adjusting the cluster number increases the clustering number by adding a new cluster having value based upon a ranking of a difference in the record number for a partition predicted from the database clusterin and a number based upon a scanning of the database.

33. The method of claim 32 comprising the step of choosing an emphasis factor which allocates between the continuous and the discrete components in identifying regions of low and high density of data points.

34. Apparatus for use with a data mining system for evaluating a database made up of data records having multiple attributes comprising:
   a) means for choosing a first cluster number to use in clustering data contained in a database;
   b) means for clustering the data records from the database using the first cluster number to produce a database clustering model;
   c) means for evaluating the database clustering model by identifying regions wherein a density of data records in the database differs from data distributions predicted by the database clustering model by:
      i) dividing an attribute space of the database into multiple partitions;
      ii) assigning a specified number of partitions to each of the multiple data record attributes based upon the database clustering model; and
      iii) determining a density of data records within the multiple partitions to evaluate the sufficiency of the database clustering model; and
   d) means for adjusting the cluster number based on the identification of said regions and again clustering the data within the database to produce a subsequent database clustering model having a different cluster number.

35. A method of querying a database containing data records stored in the database comprising the steps of:
   a) clustering data from data records having multiple attributes including one or more attributes containing continuous, nondiscrete data that are stored on a database to provide an initial cluster model having an initial probability distribution describing data records in the database and wherein each cluster attribute is characterized by a Gaussian functional depiction of the cluster;
   b) comparing the initial probability distribution with a representative sample of records in the database to determine a sufficiency of said initial probability distribution;
   c) modifying the cluster model to provide an adjusted cluster model that characterizes the data in the database, said modifying step performed by adjusting the cluster model to reduce discrepancies between the initial probability distribution and data sampled from the database; and
   d) determining a sum or a count of data records from the database falling within specified ranges of the multiple dimensions by integrating a functional representation based on the probability distribution of the adjusted cluster model over the ranges.

36. The method of claim 35 wherein the determining step limits some but not all of the attributes to specific ranges and wherein the integrating step for continuous attributes not limited to a range is performed over an entire range of said attributes.

37. A method of querying a database containing data records stored in the database comprising the steps of:
   a) clustering data from data records having multiple attributes that are stored on a database to provide an initial cluster model having an initial probability distribution describing data records in the database derived from a covariance matrix based on the data in the database;
   b) comparing the initial probability distribution with a representative sample of records in the database to determine a sufficiency of said initial probability distribution;
   c) modifying the cluster model to provide an adjusted cluster model that characterizes the data in the database, said modifying step performed by adjusting the cluster model to reduce discrepancies between the initial probability distribution and data sampled from the database; and
   d) determining a sum or a count of data records from the database falling within specified ranges of the multiple dimensions by integrating a functional representation based on the probability distribution of the adjusted cluster model over the ranges.

38. A computer-readable medium having computer executable instructions for performing steps comprising:
   a) clustering data from data records having multiple attributes including one or more attributes containing continuous, nondiscrete data that are stored on a database to provide an initial cluster model having an initial probability distribution describing data records in the database and wherein each cluster attribute is characterized by a Gaussian functional depiction of the cluster;
   b) comparing the initial probability distribution with a representative sample of records in the database to determine a sufficiency of said initial probability distribution;
   c) modifying the cluster model to provide an adjusted cluster model that characterizes the data in the database, said modifying step performed by adjusting the cluster model to reduce discrepancies between the initial probability distribution and data sampled from the database; and
   d) determining a sum or a count of data records from the database falling within specified ranges of the multiple dimensions by integrating a functional representation based on the probability distribution of the adjusted cluster model over the ranges.

39. A computer-readable medium having computer executable instructions for performing steps comprising:
   a) clustering data from data records having multiple attributes that are stored on a database to provide an initial cluster model having an initial probability distribution describing data records in the database derived from a covariance matrix based on the data in the database;
   b) comparing the initial probability distribution with a representative sample of records in the database to determine a sufficiency of said initial probability distribution;
   c) modifying the cluster model to provide an adjusted cluster model that characterizes the data in the database, said modifying step performed by adjusting the cluster model to reduce discrepancies between the initial probability distribution and data sampled from the database; and
   d) determining a sum or a count of data records from the database falling within specified ranges of the multiple dimensions by integrating a functional representation based on the probability distribution of the adjusted cluster model over the ranges.

* * * * *